United States Patent
Delker et al.

(10) Patent No.: US 9,123,062 B1
(45) Date of Patent: Sep. 1, 2015

(54) AD SPONSORED INTERFACE PACK

(75) Inventors: Jason R. Delker, Olathe, KS (US);
Michael P. McMullen, Leawood, KS (US); M. Jeffrey Stone, Overland Park, KS (US); Peter S. Syromiatnikov, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 768 days.

(21) Appl. No.: 13/031,123

(22) Filed: Feb. 18, 2011

(51) Int. Cl.
*G06Q 30/00* (2012.01)
*G06Q 30/02* (2012.01)

(52) U.S. Cl.
CPC ................... *G06Q 30/0269* (2013.01)

(58) Field of Classification Search
CPC ................ G06Q 30/0267; G06Q 30/0269
USPC .................... 705/26.1, 27.1, 14.64
See application file for complete search history.

(56) References Cited

U.S. PATENT DOCUMENTS

| | | | |
|---|---|---|---|
| 5,003,584 A | 3/1991 | Benyacar et al. |
| 5,732,216 A | 3/1998 | Logan et al. |
| 5,950,200 A | 9/1999 | Sudai et al. |
| 6,064,975 A | 5/2000 | Moon et al. |
| 6,186,553 B1 | 2/2001 | Phillips et al. |
| 6,356,838 B1 | 3/2002 | Paul |
| 6,622,016 B1 | 9/2003 | Sladek et al. |
| 6,647,260 B2 | 11/2003 | Dusse et al. |
| 6,947,531 B1 | 9/2005 | Lewis et al. |
| 6,978,132 B1 | 12/2005 | Sladek et al. |
| 6,986,107 B2 | 1/2006 | Hanggie et al. |
| 7,031,437 B1 | 4/2006 | Parsons et al. |
| 7,072,653 B1 | 7/2006 | Sladek et al. |
| 7,073,130 B2 | 7/2006 | Novak et al. |
| 7,215,754 B1 | 5/2007 | Woodson et al. |
| 7,260,382 B1 | 8/2007 | Lamb et al. |
| 7,260,386 B1 | 8/2007 | Haldar et al. |
| 7,500,198 B2 | 3/2009 | Mathews et al. |
| 7,558,953 B2 | 7/2009 | Osthoff et al. |
| 7,702,322 B1 | 4/2010 | Maurya et al. |
| 7,930,636 B2 | 4/2011 | Garbow et al. |
| 7,945,952 B1 | 5/2011 | Behforooz |
| 7,970,386 B2 | 6/2011 | Bhat et al. |
| 8,012,219 B2 | 9/2011 | Mendez et al. |
| 8,150,962 B1 | 4/2012 | Wolter |

(Continued)

FOREIGN PATENT DOCUMENTS

WO 2009056148 A1 5/2009
WO 2014022446 A1 2/2014

OTHER PUBLICATIONS

FAIPP Office Action dated Jan. 24, 2014, U.S. Appl. No. 12/876,220, filed Sep. 6, 2010.

(Continued)

*Primary Examiner* — Brandy A Zukanovich

(57) ABSTRACT

A method comprises detecting presence information of one or more IDs stored on a mobile communication device, wherein the IDs are stored in a non-transitory memory on the mobile communication device, wherein a first ID of the one or more IDs is active on the mobile communication device; and wherein the IDs comprise an auto-installation routine and at least one of an application, a media file, and a widget. The method also comprises providing a content from a sponsor of the first ID to the mobile communication device, wherein the content is activated in association with a call on the mobile communication device.

20 Claims, 11 Drawing Sheets

(56) References Cited

U.S. PATENT DOCUMENTS

| | | |
|---|---|---|
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,401,529 B1 | 3/2013 | Delker et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,583,091 B1* | 11/2013 | Delker et al. ............... 455/414.3 |
| 8,589,911 B1 | 11/2013 | Sharkey et al. |
| 8,838,087 B1 | 9/2014 | Delker et al. |
| 8,843,122 B1 | 9/2014 | Wick et al. |
| 8,954,041 B1 | 2/2015 | Delker et al. |
| 8,972,592 B1 | 3/2015 | Delker et al. |
| 9,043,446 B1 | 5/2015 | Davis et al. |
| 2001/0048737 A1 | 12/2001 | Goldberg et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0107139 A1 | 6/2004 | Shibanuma |
| 2004/0110486 A1 | 6/2004 | Sobel |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203613 A1 | 10/2004 | Zhu et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0071780 A1 | 3/2005 | Muller et al. |
| 2005/0085272 A1 | 4/2005 | Anderson et al. |
| 2005/0177506 A1 | 8/2005 | Rissanen |
| 2005/0283475 A1 | 12/2005 | Beranek et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0190569 A1 | 8/2006 | Neil et al. |
| 2006/0258289 A1 | 11/2006 | Dua |
| 2006/0277469 A1 | 12/2006 | Chaudhri et al. |
| 2007/0027852 A1 | 2/2007 | Howard et al. |
| 2007/0060099 A1 | 3/2007 | Ramer et al. |
| 2007/0067738 A1 | 3/2007 | Flynt et al. |
| 2007/0088851 A1 | 4/2007 | Levkovitz et al. |
| 2007/0105529 A1 | 5/2007 | Lundstrom et al. |
| 2007/0109580 A1 | 5/2007 | Yoshida |
| 2007/0116227 A1 | 5/2007 | Vitenson et al. |
| 2007/0130156 A1 | 6/2007 | U. Tenhunen et al. |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1* | 1/2008 | Pyhalammi et al. ............ 705/14 |
| 2008/0034309 A1 | 2/2008 | Louch et al. |
| 2008/0092057 A1 | 4/2008 | Monson et al. |
| 2008/0103971 A1 | 5/2008 | Lukose et al. |
| 2008/0170676 A1 | 7/2008 | Douma et al. |
| 2008/0192714 A1 | 8/2008 | Kim et al. |
| 2008/0214172 A1 | 9/2008 | Anwer |
| 2008/0254774 A1 | 10/2008 | Lee |
| 2008/0276182 A1 | 11/2008 | Leow |
| 2008/0305775 A1* | 12/2008 | Aaltonen et al. ............ 455/412.1 |
| 2008/0319887 A1 | 12/2008 | Pizzi et al. |
| 2009/0017870 A1 | 1/2009 | An |
| 2009/0077495 A1 | 3/2009 | Bhat et al. |
| 2009/0181716 A1 | 7/2009 | Benco et al. |
| 2009/0186651 A1 | 7/2009 | You |
| 2009/0228824 A1* | 9/2009 | Forstall et al. ................. 715/779 |
| 2009/0254753 A1 | 10/2009 | De Atley et al. |
| 2009/0260004 A1 | 10/2009 | Datta et al. |
| 2009/0291674 A1 | 11/2009 | Choi |
| 2009/0307679 A1* | 12/2009 | Lee et al. ...................... 717/168 |
| 2010/0005196 A1 | 1/2010 | Wolff-Petersen |
| 2010/0030901 A1* | 2/2010 | Hallberg et al. ............. 709/228 |
| 2010/0060549 A1 | 3/2010 | Tsern |
| 2010/0087175 A1 | 4/2010 | Roundtree |
| 2010/0115438 A1 | 5/2010 | Chu |
| 2010/0184422 A1 | 7/2010 | Ahrens |
| 2010/0190478 A1 | 7/2010 | Brewer et al. |
| 2010/0191608 A1 | 7/2010 | Mikkelsen et al. |
| 2010/0197219 A1 | 8/2010 | Issa et al. |
| 2010/0222035 A1 | 9/2010 | Robertson et al. |
| 2010/0234051 A1 | 9/2010 | Holden et al. |
| 2010/0279667 A1 | 11/2010 | Wehrs et al. |
| 2010/0281427 A1 | 11/2010 | Ghosh et al. |
| 2010/0303227 A1 | 12/2010 | Gupta |
| 2011/0072121 A1 | 3/2011 | Takasugi et al. |
| 2011/0161149 A1 | 6/2011 | Kaplan |
| 2011/0161484 A1 | 6/2011 | Van den Bogaert et al. |
| 2011/0210933 A1 | 9/2011 | Forstall |
| 2011/0238496 A1 | 9/2011 | Gurbuxani et al. |
| 2011/0295980 A1* | 12/2011 | Aldis et al. ..................... 709/219 |
| 2011/0314389 A1 | 12/2011 | Meredith et al. |
| 2012/0016735 A1* | 1/2012 | Park et al. ................... 705/14.42 |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2013/0097654 A1 | 4/2013 | Aciicmez et al. |
| 2013/0275915 A1 | 10/2013 | Wang |
| 2014/0036697 A1 | 2/2014 | Annan et al. |
| 2014/0047559 A1 | 2/2014 | Vera et al. |
| 2014/0127662 A1 | 5/2014 | Kron et al. |
| 2014/0173462 A1 | 6/2014 | Mattingly et al. |

OTHER PUBLICATIONS

Office Action dated Dec. 26, 2013, U.S. Appl. No. 13/018,083, filed Jan. 31, 2011.

Advisory Action dated Nov. 22, 2013, U.S. Appl. No. 13/118,058, filed May 27, 2011.

Final Office Action dated Mar. 20, 2014, U.S. Appl. No. 12/876,220, filed Sep. 6, 2010.

Notice of Allowance dated May 6, 2014, U.S. Appl. No. 12/876,220, filed Sep. 6, 2010.

Pre-Interview Communication dated Mar. 28, 2014, U.S. Appl. No. 14/019,053, filed Sep. 5, 2013.

Final Office Action dated Apr. 3, 2014, U.S. Appl. No. 13/018,083, filed Jan. 31, 2011.

Advisory Action dated Jun. 9, 2014, U.S. Appl. No. 13/018,083, filed Jan. 31, 2011.

Office Action dated Mar. 18, 2014, U.S. Appl. No. 13/118,058, filed May 27, 2011.

Pre-Interview Communication dated Jun. 9, 2014, U.S. Appl. No. 13/271,207, filed Oct. 11, 2011.

Pre-Interview Communication dated Mar. 21, 2014, U.S. Appl. No. 13/537,610, filed Jun. 29, 2012.

Notice of Allowance dated May 18, 2014, U.S. Appl. No. 13/537,610, filed Jun. 29, 2012.

Office Action dated May 29, 2014, U.S. Appl. No. 12/470,352, filed May 21, 2009.

Wick, Ryan A., et al., Patent Application entitled "Mobile Phone Controls Preprocessor" filed Jun. 29, 2012, U.S. Appl. No. 13/537,610.

Foreign Communication From a Related Counterpart Application—International Search Report and Written Opinion, PCT/US2013/052805 Oct. 4, 2013.

Advisory Action dated Aug. 6, 2013, U.S. Appl. No. 13/018083, filed Jan. 31, 2011.

Final Office Action dated Sep. 10, 2013, U.S. Appl. No. 13/118,058, filed May 27, 2011.

Delker, Jason R., et al., Patent Application entitled "System and Method for ID Platform," filed Sep. 5, 2013, U.S. Appl. No. 14/019,053.

(56) References Cited

OTHER PUBLICATIONS

Delker, Jason R., et al., Patent Application entitled "Dynamic Loading, Unloading, and Caching of Alternate Complete Interfaces," filed Sep. 30, 2013, U.S. Appl. No. 14/042,707.
Annan, Brandon C., et al., International Application entitled, "Traffic Management of Third Party Applications", filed Jul. 24, 2013, Serial No. PCT/US13/52805.
Pre-Interview Communication dated Feb. 26, 2013, U.S. Appl. No. 13/023,486, filed Feb. 8, 2011.
Final Office Action dated Jan. 11, 2013, U.S. Appl. No. 12/876,221, filed Sep. 6, 2010.
Pre-Interview Communication dated Feb. 26, 2013, U.S. Appl. No. 13/118,058, filed May 27, 2011.
Office Action dated Mar. 14, 2013, U.S. Appl. No. 13/161,496, filed Jun. 16, 2011.
Examiner's Answer dated Jan. 9, 2013, U.S. Appl. No. 12/417,081, filed Apr. 2, 2009.
Delker, Jason R., et al., Patent Application entitled "Transition Experience During Loading and Updating an Interface and Applications Pack," filed Oct. 24, 2012, U.S. Appl. No. 13/659,889.
First Action Interview Pre-Interview Communication dated Apr. 24, 2012, U.S. Appl. No. 12/876,220, filed Sep. 6, 2010.
FAIPP Office Action dated May 10, 2012, U.S. Appl. No. 12/876,221, filed Sep. 6, 2010.
Notice of Allowance dated Mar. 30, 2012, U.S. Appl. No. 13/029,103, filed Feb. 16, 2011.
Final Office Action dated Apr. 13, 2012, U.S. Appl. No. 12/417,081, filed Apr. 2, 2009.
Notice of Allowance dated Apr. 25, 2012, U.S. Appl. No. 12/715,197, filed Mar. 1, 2010.
Notice of Allowance dated Jun. 4, 2013, U.S. Appl. No. 13/023,486, filed Feb. 8, 2011.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Final Office Action dated May 10, 2013 U.S. Appl. No. 13/018,083, filed Jan. 31, 2011.
First Action Interview Office Action dated May 6, 2013, U.S. Appl. No. 13/118,058, filed May 27, 2011.
Notice of Allowance dated Apr. 29, 2013, U.S. Appl. No. 13/537,563, filed Jun. 29, 2012.
Notice of Allowance dated Jun. 27, 2013, U.S. Appl. No. 13/161,496, filed Jun. 16, 2011.
FAIPP Pre-Interview Communication dated Jul. 19, 2012, U.S. Appl. No. 13/018,083, filed Jan. 31, 2011.
Advisory Action dated Jun. 18, 2012, U.S. Appl. No. 12/417,081, filed Apr. 2, 2009.
Cha, Tae-Woo, et al., Patent Application entitled "Device Experience Adaptation Based on Schedules and Events," filed Jun. 29, 2012, U.S. Appl. No. 13/537,563.
Delker, Jason R., et al., Patent Application entitled "Sponsored Keyword Usage in Voice Communication," filed Jul. 13, 2012, U.S. Appl. No. 13/549,390.
Notice of Allowance dated Nov. 8, 2012, U.S. Appl. No. 13/549,390 filed Jul. 13, 2012.
Annan, Brandon C., et al., Patent Application entitled, "Traffic Management of Third Party Applications", filed Jul. 31, 2012, U.S. Appl. No. 13/536,709.
Ackerman, Samuel K., "Lecture Slides: Mapping User Interface Design to Culture Dimensions", Aaron Marcus and Associates, Inc., 2001.
Kenja's Newsletter, About Newsletter, http://kenja.net/news.main.html, printed from the World Wide Web, "last modified Fri, Oct. 10, 2003".
Openwave, "Comparison of WAP Push and Short Message Service (SMS)," Openwave Systems, Inc., Redwood City, CA, Apr. 2002.
QUALCOMM, uiOne™, http://brew.qualcomm.com/brew/in/about/uione.html.
Scansoft press release, "Scansoft Launches SpeechPAK Healthcare Suite 2.0", http://dragontranscription.com/press-release-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Advisory Action dated Aug. 26, 2011, U.S. Appl. No. 12/417,081, filed Apr. 2, 2009.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Apr. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.
Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Wolter, Eric S., Patent Application entitled "Method and System for Delivery of User-Interface Skins, Applications, and Services to Wireless Devices," filed Jan. 17, 2006, U.S. Appl. No. 11/333,964.
Burcham, Robert H., Patent Application entitled "Multi-Call Ringback Reward Method," filed Nov. 22, 2006, U.S. Appl. No. 11/603,615.
Katzer, Robin Dale, et al., Patent Application entitled "Zone Architecture for Dynamic Targeted Content Creation," filed Oct. 11, 2011, U.S. Appl. No. 13/271,207.
Office Action dated Nov. 10, 2011, U.S. Appl. No. 12/417,081, filed Apr. 2, 2009.
Final Office Action dated Nov. 29, 2011, U.S. Appl. No. 12/470,352, filed May 21, 2009.
Office Action—Restriction Requirement dated Feb. 1, 2012, U.S. Appl. No. 12/876,221, filed Sep. 6, 2010.
Advisory Action dated Feb. 6, 2012, U.S. Appl. No. 12/470,352, filed May 21, 2009.
First Action Interview Pre-Interview Communication dated Feb. 22, 2012, U.S. Appl. No. 12/715,197, filed Mar. 1, 2010.
Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.
Office Action dated Feb. 23, 2011, U.S. Appl. No. 12/417,081, filed Apr. 2, 2009.
Final Office Action dated Jun. 21, 2011, U.S. Appl. No. 12/417,081, filed Apr. 2, 2009.
Office Action dated Jun. 21, 2011, U.S. Appl. No. 12/470,352, filed May 21, 2009.
Delker, Jason R., et al., Patent Application entitled "Provisioning System and Methods for Interfaceless Phone," filed Sep. 6, 2010, U.S. Appl. No. 12/876,220.
Delker, Jason R., et al., Patent Application entitled "System and Method for ID Platform," filed Feb. 8, 2011, U.S. Appl. No. 13/023,486.
Delker, Jason R., et al., Patent Application entitled "Dynamic Loading, Unloading, and Caching of Alternate Complete Interfaces," filed Sep. 6, 2010, U.S. Appl. No. 12/876,221.
Delker, Jason R., et al., Patent Application entitled "Shared ID with Second Party," filed Jan. 31, 2011, U.S. Appl. No. 13/018,083.
Delker, Jason R., et al., Patent Application entitled "Extending ID to a Computer System," filed May 27, 2011, U.S. Appl. No. 13/118,058.

(56) References Cited

OTHER PUBLICATIONS

Davis, John M., et al., Patent Application entitled "Mirroring Device Interface Components for Content Sharing," filed Mar. 10, 2011, U.S. Appl. No. 13/045,292.

Cha, Tae-Woo, et al., Patent Application entitled "Device Experience Adaptation Based on Schedules and Events," filed Feb. 16, 2011, U.S. Appl. No. 13/029,103.

Smith, Nathan A., et al., Patent Application entitled "Restricted Testing Access for Electronic Device," filed Jun. 16, 2011, U.S. Appl. No. 13/161,496.

Delker, Jason R., et al., Patent Application entitled "Content Provider Sponsored Services System and Methods," filed Apr. 2, 2009, U.S. Appl. No. 12/417,081.

Breau, Jeremy R., et al., Patent Application entitled "Post-Dial Pre-Connect Advertising and Call Sponsorship," filed May 21, 2009, U.S. Appl. No. 12/470,352.

Delker, Jason R., et al., Patent Application entitled "Sponsored Keyword Usage in Voice Communication," filed Mar. 1, 2010, U.S. Appl. No. 12/715,197.

Foreign Communication From a Related Counterpart Application—International Preliminary Report on Patentability dated Feb. 12, 2015, PCT/US2013/052805 filed on Jul. 24, 2013.

Supplemental Notice of Allowance dated Dec. 3, 2014, U.S. Appl. No. 13/118,058, filed May 27, 2011.

Notice of Allowance dated Jan. 6, 2015, U.S. Appl. No. 13/045,292, filed Mar. 10, 2011.

Office Action dated Dec. 17, 2014, U.S. Appl. No. 13/563,709, filed Jul. 31, 2012.

FAIPP Office Action dated Dec. 2, 2014, U.S. Appl. No. 13/271,207, filed Oct. 11, 2011.

Notice of Allowance dated Aug. 13, 2014, U.S. Appl. No. 14/019,053, filed Sep. 5, 2013.

Office Action dated Sep. 23, 2014, U.S. Appl. No. 13/018,083, filed Jan. 31, 2011.

Notice of Allowance dated Oct. 22, 2014, U.S. Appl. No. 13/118,058, filed May 27, 2011.

Pre-Interview Communication dated Aug. 6, 2014, U.S. Appl. No. 13/045,292, filed Mar. 10, 2011.

First Action Interview Office Action dated Oct. 10, 2014, U.S. Appl. No. 13/045,292, filed Mar. 10, 2011.

Pre-Interview Communication dated Aug. 8, 2014, U.S. Appl. No. 13/659,889, filed Oct. 24, 2012.

First Action Interview dated Oct. 15, 2014, U.S. Appl. No. 13/659,889, filed Oct. 24, 2012.

Wick, Ryan A., et al., Patent Application entitled "Mobile Phone Controls Preprocessor" filed on Sep. 3, 2014, U.S. Appl. No. 14/476,339.

Final Office Action dated May 18, 2015, U.S. Appl. No. 13/659,889, filed Oct. 24, 2012.

Schwermann, Nathan M., et al., entitled "Methods for Customization of Default Applications on a Mobile Communication Device," filed Apr. 30, 2015, U.S. Appl. No. 14/701,156.

\* cited by examiner

AD SPONSORED INTERFACE PACK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An effective user interface for a mobile device may be readily understood and provide the user a sense of comfort and control. Users may see the range of their choices, understand how to accomplish their objectives, and complete their tasks. The interface and its applications may speak the users' language, with familiar phrases and words, instead of terms oriented to the system of the device or complicated technology details. Information presented by the interface appears in a natural and logical order.

SUMMARY

In an embodiment, a method comprises detecting presence information of one or more IDs stored on a mobile communication device, wherein the IDs are stored in a non-transitory memory on the mobile communication device, wherein a first ID of the one or more IDs is active on the mobile communication device; and wherein the IDs comprise an auto-installation routine and at least one of an application, a media file, and a widget. The method also comprises providing a content from a sponsor of the first ID to the mobile communication device, wherein the content is activated in association with a call on the mobile communication device.

In an embodiment, a system comprises a voicemail store, wherein the voicemail store is retained in a non-transitory media. The system also comprises an interface application, that, when executed on a processor, provides presence information of one or more IDs stored on a mobile communication device to a presence server, wherein a first ID of the one or more IDs is active on the mobile communication device, and wherein the IDs comprise an auto-installation routine and at least one of an application, a media file, and a widget; activates a content associated with the first ID in association with an access of the voicemail store.

In an embodiment, a method comprises detecting the presence of an active ID on a mobile communication device, wherein the ID is stored in a non-transitory memory on the mobile communication device, and wherein the ID comprises an auto-installation routine and at least one of an application, a media file, and a widget; providing a content from a sponsor of the active ID to the mobile communication device, wherein the content is activated in association with a call on the mobile communication device. The method also comprises detecting a feedback from a caller in response to the activated content and sending a second content to the caller in response to the feedback.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
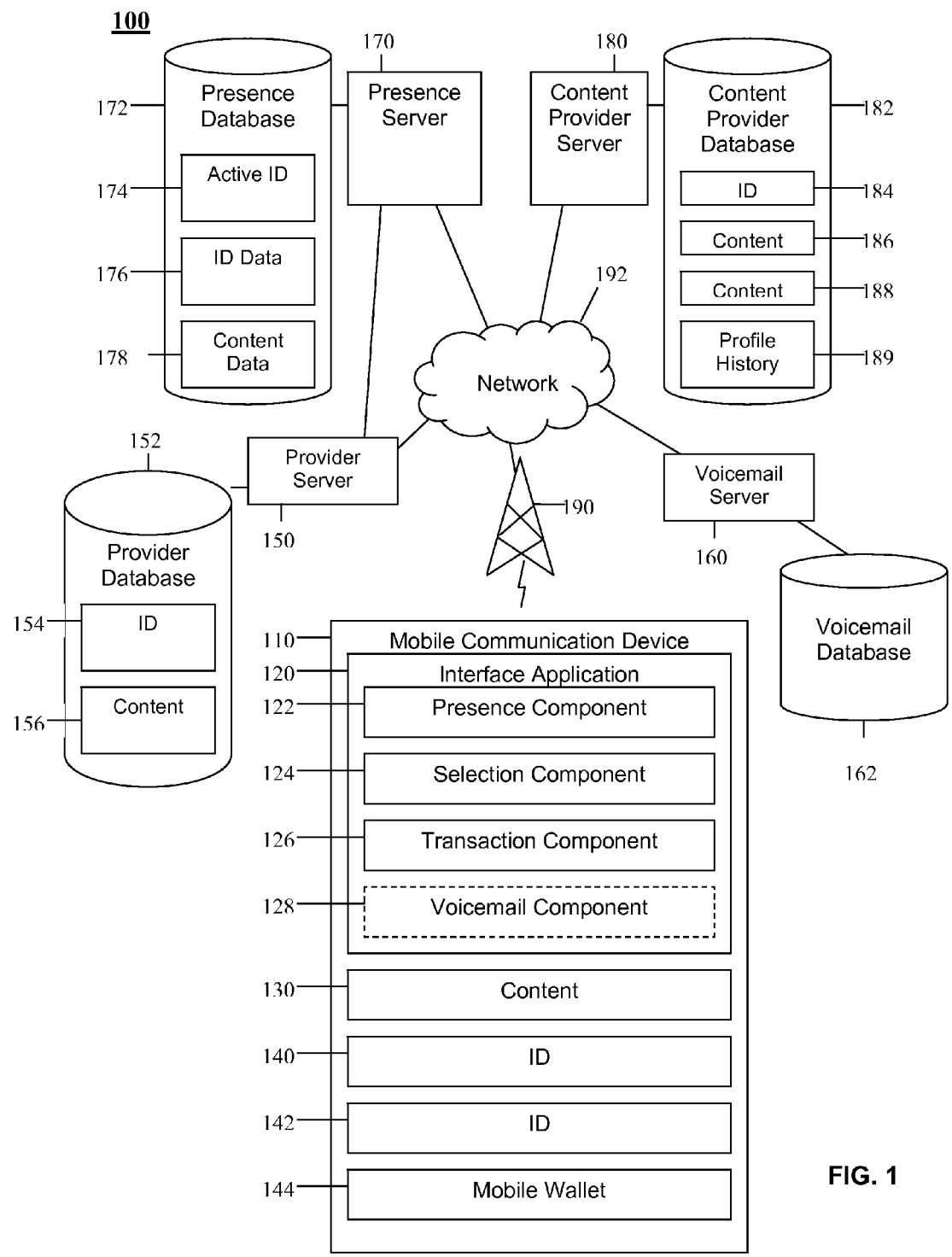
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides systems and methods for dynamically loading and mediating content by a content provider on a mobile device that may be associated with an ID sponsored by the content provider. As described in more detail below, an ID comprises an auto-installation routine or application, and at least one of: an application, a media file, and a widget. In an embodiment, the presence of one or more IDs may be detected on the mobile device, and information about the detected IDs (e.g., which ID is active) may be sent to a content provider. In an embodiment, the system may comprise a record of the IDs on the mobile device that can be stored, for example in a presence server. A provider that may be the sponsor and/or creator of the ID may then access the presence server to determine which ID is running on the mobile device. The content provider may then provide content to the mobile device that is associated with the ID. The ID running on the mobile device may provide some level of control to the content provider to load and activate content associated with the active ID so long as the ID is activated and running.

The content, executables, network services, and data provided by the content provider may comprise web widgets, tiles, really simple syndication (RSS) feed icons, media players, wallpapers, themes, ring tones, call tones, applications, listings of internet links, voicemail, and any combination thereof. In an embodiment, the content may comprise audible and/or visual content to the device including music, ring tones, advertisements, electronic promotions, and price information. Based on a profile associated with the device and information about previous activities of the device and its user, the content provider may transmit customized information, including promotions, to the device. The ID running on the mobile device may access a plurality of network services based on the content received from the provider and/or third party provider, or may access a plurality of network services to obtain at least a portion of the content. This functionality may allow for the provider to control some of the content presented to and running on the mobile device and may associate the content with various functions, such as voicemail greetings, incoming call tones, outgoing call tones, etc. In an embodiment, the content may comprise an advertisement intended for the user of the mobile device or a caller initiating a communication with the mobile device. The advertisement may be interactive and require feedback from the user prior to placing a call on the mobile device. The feedback may be tracked and maintained in a database on a provider server. In an embodiment, the advertisement may be initiated and executed according to any of the systems or methods disclosed in co-pending U.S. patent application Ser. No. 12/470, 352 entitled "Post-dial Pre-connect Advertising and Call Sponsorship" to Breau et al., filed on May 21, 2009, which is incorporated herein by reference in its entirety.

For example, a mobile communication device running an ID sponsored by the Oprah Winfrey Show may have a voicemail greeting with the voice of Oprah marketing Oprah's book of the month. The ringtone of the mobile communication device may be the Oprah theme song, the wallpaper may be the Oprah trademark, and a banner advertisement playing on the mobile communication device homepage may be Oprah's CD choice of the week. Further, an advertisement sponsored by Oprah may be interactive and request feedback in the form of a survey, a question about the daily Oprah show, or feedback about the products being promoted by Oprah. The Oprah ID may be updated daily at the control of the Oprah ID through data obtained from a content server maintained by the Oprah Winfrey Show. The Oprah ID may continue to present the advertisements, call tones, and ringtones until the ID is exchanged for another ID or removed from the mobile communication device.

FIG. 1 illustrates a system 100 of dynamic loading and activating of content from a content provider. The system 100 comprises a mobile communication device 110, an interface application 120, a mobile wallet 144, content 130, IDs 140, 142, a provider server 150, a presence server 170, a presence database 172, a content provider server 180, content provider database 182, a voicemail server 160, a voicemail database 162, a base transceiver station 190, and a network 192.

The interface application 120 executes on the mobile communication device 110 and comprises a plurality of components 122, 124, 126, 128 with various functionalities associated with the mobile communication device 110. In an embodiment, the interface application 120 comprises a presence component 122, a selection component 124, a transaction component 126, and an optional voicemail component 128, which are described in more detail below. The interface application 120 may be configured to communicate with a plurality of servers including, but not limited to, the provider server 150, the presence server 170, the content provider server 180, and the voicemail server 160. The interface application 120 may communicate with the servers 150, 160, 170, 180 directly via the network 192, or the interface application may route the connection with the voicemail server 160, the presence server 170, and the content provider server 180 through the provider server 150. The communication between the interface application 120 and the servers 150, 160, 170, and 180 may comprise a data connection and/or a voice connection, and may be routed through any communication means including, but not limited to, the network 192.

The interface application 120 may load and run one or more IDs 140, 142 on the mobile communication device 110 to provide a user interface for the mobile communication device 110. In an embodiment, the interface application may load a new ID 154, 184 onto the mobile communication device 110 from the provider server 150 and/or the content provider server 180. When loaded and activated on the mobile communication device 110, the IDs 140, 142 and any associated content 130 may become the user interface or user experience for the mobile communication device 110. The user interface created by activating the loaded IDs 140, 142 may be permanent or may be temporary. The user interface created from one of the IDs 140 may be replaced by a user interface created from another of the IDs 142 on the mobile communication device 110, or from another ID 154, 184 loaded from the provider server 150 and/or the content provider server 180.

The user interface for the mobile communication device 110 resulting from the loading of an ID 140, 142 stored on the mobile communication device 110 and operated using the interface application 120 may comprise the full user experience and may comprise components and/or content 130 that may be viewed and/or selected in the viewing area and optional keypad of the mobile communication device 110. The complete interface also may comprise components and/or content that are executing but are "in the background" and not visible to the user. The IDs 140, 142 may comprise components that may include software items that access services across the network 192, for example network services applications. In order to access services across the network 192, the software items may periodically generate transmissions to external providers of services and request information, messages, news, or other items that may be periodically refreshed by the external provider. Loading of the ID 140 may comprise loading software components on the mobile communication device 110 that access services across the network 192. The components of the IDs 140, 142 may further comprise media files and/or content 130 such as a graphic file defining a background for a display, one more audio files defining distinctive tones to be played during power-on, power-off, ringing, incoming calls, and other events. The media files may be accessed across the network 192 and/or stored locally on the mobile communication device 110 in a non-transitory storage device, for example, as content 130.

The system 100 may comprise one or more IDs 140, 142 that may be loaded on the mobile communication device 110 and activated to provide the user interface of the mobile communication device 110. As used herein, an ID comprises an auto-installation routine or application and at least one of: an application, a network service, a wallpaper, a media file, a widget, a screensaver, a ringtone, and any combination thereof which may be used to provide a custom look and functionality to a mobile communication device 110. Further, an ID comprises an auto-installation routine or application that automatically manages downloading the several components of the ID onto the portable electronic device and making some configuration settings on the mobile communication device 110, thereby saving the user having to go to a plurality of different locations and download the several components of the ID in a series of distinct transactions. In an embodiment, the auto-installation routine or application may include, exclusively or in part, instructions on configuration of the mobile communication device's appearance such as the home screen. For example, the auto-installation routine may comprise configuration instructions for the shortcuts, bookmarks, and placement of widgets on an output component of the mobile communication device. As used herein, widgets are small specialized graphical user interface (GUI) applications that provide some visual information and easy access to frequently used functions such as clocks, calendars, new aggregators, and/or internet web sites. Web widgets may be hypertext markup language (HTML) packages of code that may use really simple syndication (RSS) and other technologies to elevate the data experience to the icon on the display of the mobile communication device 110. Examples of web widgets comprise the reporting of a score of a currently ongoing sporting event or the reporting of stock market prices. While ID 140 is discussed hereinafter, it is understood that another ID 142 on the mobile communication device 110 or ID 154, 184 that may be loaded onto the mobile communication device 110 alternatively may be used in substantially the same manner as ID 140. While only one ID 184 is shown in the content provider database 182 and one ID 154 in the provider database 152, it should be understood that any number of IDs may be available from the content provider database 182 and/or the provider database 152. Further, while only one content provider server 180 is shown in FIG. 1 and discussed for clarity, it should be understood that any number of content providers may have one or more content provider servers available to provide IDs and content associated with those IDs.

The IDs 140, 142 may be precertified by a telecommunications service provider and may load automatically on the mobile communication device 110 using tested routines. The provider database 152 and/or the content provider database 182 may contain IDs 154, 184 that may be precertified and can be loaded on the mobile communication device 110 to supplement or replace the IDs 140, 142 on the mobile communication device 110. In an embodiment, any number of IDs may be stored on the mobile communication device 110. The IDs 154, 184 may contain other components, content, or combinations thereof that comprise items such as widgets, tiles, ring tones, wallpaper, media, files, applications, access to network services, and other user interface items. The telecommunications service provider may provide wireless voice and data services to the mobile communication device 110. The telecommunications service provider may be associated with a provider server 150 and a provider database 152 and may have provided IDs 140, 142 to the mobile communication device 110. The content provider server 180 may be associated with entities separate from the telecommunications service provider. The telecommunications service provider may arrange with the operator of the content provider servers 180 to build one or more customized IDs, such as ID 184, containing components and/or content available for download to the mobile communication device 110.

The IDs 140, 142 may be specific to the business interests and operations of the content provider servers 180. The content provider server 180 may be associated with content providers, for example enterprises, businesses, or other entities, that may wish to provide a customized bundle or package of trusted IDs 140, 142 and or content 130 that may be used as the user interface for the mobile communication device 110. The IDs 140, 142 may be activated on the mobile communication device 110 with pre-loaded permissions to provide the content provider server 180 direct access to the loading and activation of ID 184 on the mobile communication device 110 in association with various functions of the mobile communication device 110, as described in more detail herein.

The telecommunications service provider may precertify the IDs 140, 142 available from the operators of the content provider server 180 and may precertify the software routines written to promote their automated loading. By precertifying the IDs 140, 142 and the loading routines of a plurality of operators of content provider servers, such as content provider server 180, the telecommunications service provider may facilitate the loading of the IDs 140, 142 and the associated content. The telecommunications service provider may also facilitate and mediate the loading of one or more IDs 184 and the associated content 186 by providing routing of an ID 184 and/or content 186 from the content provider server 180, and/or storing the content provider's ID 154 and/or content 156 on the provider database 152. The mobile communication device 110 may then load the ID 154 and/or content 156 from the provider database 152 to the mobile communication device 110. The routing of the ID 184 and/or content 186 through the provider server 150 may comprise any number of pathways including through the network 192.

The components and/or content obtained as part of the ID 140 loaded on the mobile communication device 110 may comprise software loaded on the mobile communication device 110 that may access network services from providers located across networks. For example, the ID 140 loaded and running on the mobile communication device 110 may use network services, such as call tones, ring tones, and/or voicemail greetings, that are obtained and refreshed from content providers across a network, for example the content provider server 180. Network services are items of value, access to which may be available through the ID 140. In an embodiment, the content provider may subsidize in part or in whole the cost of the mobile communication device 110 and/or the telecommunication services associated with the mobile communication device 110 in return for the ability to load the ID 140 and the associated content 130 on the mobile communication device 110. In an embodiment, the ability to load the ID 140 and the associated content 130 may be performed automatically at the control of the content provider. For example, while the ID 140 sponsored by a content provider associated with the content provider server 180 is loaded on the mobile communication device 110, content 186 comprising a call tone may be loaded and played back to a caller seeking to originate a voice call to the mobile communication device 110 that advertises the content provider's products. The user of the mobile communication device 110 may be provided with a discount on telecommunication services for agreeing to use the call tone with the advertising theme. The content 186 provided by the content server 180 may be further customized based on profile information associated with the mobile communication device 110 and/or its user, for example information about previous visits to the retail store and products purchased and economic, demographic, and personal information about the user.

As part of the loading of the ID 140 and the associated content 130, the content 130 may comprise interactive components that may send data back to the content provider server 180. The user of the mobile communication device 110 may consent to the transmission and use of this data by the content provider, for example as part of loading and activating the ID 140 on the mobile communication device 110. In an embodiment, the user of the mobile communication device 110 may receive free or reduced cost telecommunication services and/or a mobile communication device 110 in exchange for providing feedback on content 130 associated with the ID 140 and/or consenting to the content 130 being communicated to callers contacting the mobile communication device 110 along with any data generated during the transaction with the caller. For example, the content associated with the ID 140 loaded and running on the mobile communication device 110 may comprise audio and visual components requesting the user of the mobile device to respond to an advertising based content. For example, an advertising based content may request that the user of the mobile communication device 110 select a product from a group of products, where the correct answer may be the product associated with the content provider. The selection order may be communicated back to the content provider server 180 and recorded in the content provider database 182 in a profile history 189. Continuing with the example, subsequent communications of the content 130 to the user may produce results that show improved responses to indicate that the user has been conditioned to choose the content provider's product. In return for the data communicated back to the content provider server 180, the user may receive a discount on telecommunication services and/or the cost of the mobile communication device 110. In another embodiment, network services may be acquired through ID 140 on a subscription basis from a content provider, for example, that may operate the content provider server 180.

In an embodiment, use of an interactive content 130 associated with an active ID 140 running on the mobile communication device 110 may be recorded and used to develop a response history for the user of one or more mobile devices. When applied across a plurality of users, the data communicated back to the content provider server 180 may be used to establish a record of the effectiveness of the advertising based content. The provider of the telecommunication services may then adjust the access charges to the provider server 150 and the mobile devices based upon the effectiveness of the advertising communicated via the content 130 and the number of total responses received.

Network services may also comprise components, content, and/or functionality provided via the network 192. For example, the network services may provide access to the content through the network communications infrastructure rather than by the content 130 stored on the mobile communication device 110. In an embodiment, the communication experience may comprise call announcements, call tones, and/or voicemail greetings. Since the communication experience is generally related to calls placed from the mobile communication device 110 and/or calls received on the mobile communication device 110, the components, content, and/or functionality associated with the communication experience may also refer to the components, content, and/or functionality associated with a call on the mobile communication device 110. For example, a call tone which is played back to a calling party originating a voice call to the mobile communication device 110 may be determined by network services. The content may be provided to a network server, such as the provider server 150, directly from a content server 180 for access by the mobile communication device 110 using network services. The content may be provided to the network server from the content provider server 180 based on the currently active ID on the mobile communication device, which may be determined by the content provider server 180 accessing the presence server 170. In another embodiment, the content may be provided to the mobile communication device 110 from the content server 180 and forwarded to a network server, such as the provider server 150, for use with communications using network services. A different call tone may be defined for the mobile communication device 110 depending upon what ID 140, 142 is currently active and/or loaded on the mobile communication device 110. Loading of the ID 140 that may include access to network services may comprise loading software components on the mobile communication device 110 that periodically generate transmissions to external providers of services and request information, messages, news, or other items that may be periodically refreshed by the external provider. These software components may differ from widgets or internet links that may be also be periodically accessed.

In an embodiment, the components, content, and/or functionality may be provided via the network 192 and fully stored on the mobile communication device 110 prior to use by the ID 140 that is currently active and/or loaded on the mobile communication device 110. For example, the content 130 may be associated with the current ID 140 and may be stored on the mobile communication device 110 for use in association with the ID 140. The content provider server 180 may provide content to the mobile communication device 110 based on the currently active ID, which may be determined by the content provider server requesting presence information from the presence server 170. For example, the call tone that is played back to a calling party originating a voice call to the mobile communication device 110 may be a part of the content 130 stored on the mobile communication device 110. The content 130 may be loaded on the mobile device 130 along with the ID 140 during the initial loading of the ID 140. Alternatively, the content may be loaded from the provider server 150 and/or the content provider server 180. For example, the ID 140 may access the provider server 150 and/or the content provider server 180 on a periodic basis, such as once a day, to determine if any new content 156, 186 is available for download. Upon detecting that new content 156, 186 is available, the ID 140 may interact with the provider server 150 and/or the content provider server 180 to load the content 156, 186 onto the mobile communication device 110. The content 156, 186 may replace or supplement the content 130 stored on the mobile communication device 110. For example, the call tone that is played back to the calling party may change based on the updated content 156, 186, and may be used to communicate new content 156, 186 to calling parties. In an embodiment, the system 100 may be configured to update the content 130 stored on the mobile communication device 110 associated with the ID 140 during off-peak hours in order to more evenly use the system 100 and network resources. The system may update the content 130 associated with both active and non-activate IDs 140, 142 so that the content 130 is available if the ID is switched by the user of the mobile communication device 110.

The mobile communication device 110 may be one of a mobile telephone, a media player, and a personal digital assistant (PDA). In addition to having a radio transceiver to exchange transmissions with the base transceiver station 190 for wireless voice and data communications, the mobile communication device 110 also may contain hardware and software providing WiFi functionality that may be used in connection with the mobile communication device 110 loading the IDs 140, 142 and content 130 as described herein. The mobile communication device 110, alternatively or in addition to WiFi technology, may contain other hardware and software associated with other wireless local area network technologies that may observe the IEEE (Institute of Electrical and Electronics Engineers) 802.11 set of standards. The mobile communication device 110 is further described below.

The presence server 170 comprises presence database 172 containing information about the IDs 140, 142 and content 130 loaded and/or currently running on the mobile communication device 110. The presence server 170 may be associated with the provider server 150 and the provider of telecommunication services. The presence server 170 may interact with the presence component 122 of the interface application 120 to maintain a list of ID data 176 containing information related to the current IDs 140, 142 loaded on the mobile communication device 110, a list of content data 178 including the content 130 loaded on the mobile communication device 110 and available for use with the loaded IDs 140, 142, and data related to the currently active ID 174 on the mobile communication device 110. The presence server 170 may directly communicate with the provider server 150. In an embodiment, the presence database 172 may be a part of and co-located with the provider database 152. The presence server 170 may communicate with the provider server 150 through the network 192 and may be accessible by the content provider server 180 directly or through the provider server 150.

The presence server 170 and the associated presence database 172 may be used to indicate to a content provider which ID 140 is currently active on the mobile communication device 110. Since the ID 140 may contain access rights to the mobile communication device 110, the content provider server 180 may access, directly or through the provider server 150 via the network 192, the presence server 170 to determine which ID 140 is currently active on the mobile communication device 110. Using this information, the content provider server 180 may determine which content 186 to load on the mobile communication device 110. The presence server 170 may also be used to indicate which content 130 is already loaded on the mobile communication device 110 using a content list 178 stored in the presence database 172. In the event the content 130 determined to be loaded on the mobile communication device 110 is already resident on the mobile communication device 110, the content provider server 180 may cause the content 130 on the mobile communication device 110 to be activated in association with the ID 140 currently active rather than reloading the content 130 on the mobile communication device 110. Similarly, when an ID 140 is requested by the mobile communication device 110, the presence server 170 may be used to indicate if the ID 140 is already loaded on the mobile communication device 110. If the ID 140 is already present, the mobile communication device 110 may activate the ID 140 rather than reloading the ID 140 from the provider server 150 or the content provider server 180.

In an embodiment, the voicemail server 160 may be present in system 100 and may comprise a voicemail database 162. The voicemail server 160 may be used to store voicemail messages associated with the mobile communication device 110 in a network 192 accessible location. The voicemail server 160 may be associated with the provider server 150 and the provider of telecommunication services. In an embodiment, the voicemail server 160 may communicate with the provider server 150 through the network 192. The voicemail server 160 may be associated with content 130 on the mobile communication device 110. For example, content 130 comprising an audio file may be stored on the mobile communication device 110, on the provider server 150, and/or on the voicemail server 160 that is associated with the ID 140 currently loaded and running on the mobile communication device 110. The presence server 170 may be used to indicate which ID 140, 142 is currently active on the mobile communication device 110 such that the audio file associated with the currently active ID 140 on the mobile communication device 110 is played in response to a calling party reaching the voicemail of the user of the mobile communication device 110.

In an embodiment, the voicemail associated with a mobile communication device 110 may optionally be handled and stored on the mobile communication device 110 by a voicemail component 128. For example, a voicemail component 128 of the interface application 120 may be used to handle the voicemail for the mobile communication device 110 in place of a network implemented voicemail utilizing the voicemail server 160 and voicemail database 162, as described in more detail herein.

The provider server 150 may be associated with the provider of the telecommunication services for the mobile communication device 110 and may be coupled to a provider database 152. The provider server 150 may provide a central communication pathway for communications between the mobile communication device 110, the presence server 170, the content provider server 180, and the voicemail server 160. The provider server 150 may have a direct link to one or more of the servers 160, 170, and 180, or may use the network 192 or any other communication pathway to communicate with the servers 160, 170, 180 and the mobile communication device 110. In an embodiment, the presence server 170 and the voicemail server 160 may be a part of the provider server 150, and the corresponding presence database 172 and voicemail database 162 may comprise a portion of the provider database 152. In an embodiment, the provider server 150 may store the IDs 184 and content 186, 188 available from the content provider for loading on the mobile communication device 110 in the provider database 152. In this embodiment, the content provider server 180 may transfer one or more IDs 184 and content 186, 188 to the provider database 152 via the provider server 150. The mobile communication device 110 may then load the ID 154 and content 156 from the provider database 152 to become the ID 140 and content 130 loaded on the mobile communication device 110, rather than loading the ID 184 and content 186 directly from the content provider database 182 through the content provider server 180. In this way, the provider server 150 may be used to mediate the loading and dynamic setting of network services on the mobile communication device 110.

The content provider server 180 may be associated with content providers, for example enterprises, businesses, or other entities, that may wish to provide a customized bundle or package of trusted IDs 184 and or content 186, 188 that may be used as the user interface for the mobile communication device 110. The telecommunications service provider may precertify the ID 184 available from the operators of the content provider server 180 and may precertify the software routines written to promote their automated loading.

In order to distribute the content 130 associated with the ID 140 running on the mobile communication device 110 or an ID 142 stored on the mobile communication device 110, the mobile communication device 110 may exchange transmissions with a provider server 150 and/or a content provider server 180, be identified and qualified, and receive the content via WiFi or other wireless transmission. The ID 140 running and/or stored on the mobile communication device 110 may contain an authorization token to receive content 156, 186, 188 from the sponsor of the ID 140. The mobile communication device 110 may then provide the authorization token to the provider server 150, which may use the token to determine from its records that the mobile communication device 110 has authorized the receipt of content 156, 186, 188 from the provider and/or content provider. When the content 186, 188 is provided by the content provider server 180, the telecommunications provider may pass the authorization token and/or a network identity to the content provider server 180. Based on receipt and verification of the authorization token, the provider server 150 and/or the content provider server 180 then makes the content 156, 186, 188 available to the mobile communication device 110. An interface application 120 resident on the mobile communication device 110 may activate and load the content 130, which may occur without user intervention.

The base transceiver station 190 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination.

The interface application 120 comprises a selection component 124 that is used to configure choices regarding the content providers and other entities from which the user of the mobile communication device 110 selects and loads IDs 184 and content 186, 188. The selection component 124 may accept and execute configuration instructions regarding the servers 150, 160, 170, 180 that the mobile communication device 110 may access. The selection component 124 may configure how the mobile communication device 110 processes requests from servers 150, 160, 170, 180 to activate a communication session (e.g., a data communication session) or similar functionality associated with the mobile communication device 110 that may be used to exchange transmissions with the servers 150, 160, 170, 180. In an embodiment, the selection component 124 may be used to activate a communication session when messages are received from one or more designated content servers 150, 180 requesting activation of a communication session after the verification process described herein is completed. The communication may occur in the background and may not require user intervention or input. In an embodiment, the selection component 124 may instead provide an audible alert or other notification that a content server 150, 180 has sent a message requesting the activation of a communication session and may provide the user of the mobile communication device 110 the option of accepting or declining the request. In conjunction with the ID 140 loaded and running on the mobile communication device 110, the selection component 124 may also handle requests between the mobile communication device 110 and the provider server 150 and/or the content provider server 180 to download content 156, 186, 188 associated with the ID 140. In an embodiment, the selection component 124 may automatically load content 130 associated with ID 140 running on the mobile communication device 110.

The selection component 124 may also be responsible for loading or reloading the various IDs 140, 142 on the mobile communication device 110. When a first ID 140 comprising the active user interface is unloaded so it may be replaced by a different ID 142 comprising a second user interface, the user may wish to subsequently reload the first user interface. Instead of deleting and later fully reloading the ID 140 comprising the first user interface, portions of the ID 140 comprising the first user interface may be cached (e.g., content 130). The portions that are cached may be stored locally on the mobile communication device 110 or may be stored in a remote device, such as the provider database 152 and/or the content provider database 182. When a second ID 142 comprising the second user interface is unloaded because of user input or occurrence of another event, the selection component 124 may load another ID or reload a previous ID 140. This action may involve bringing the saved files from the first user interface out of cache, accessing current versions of the ID 140 and/or content 130 that were unloaded when the second user interface was loaded, and combining the saved portions with the newly generated current versions of the ID components and/or content. The ID components and/or content may have been unloaded in a manner such that the first user interface is reloaded but with refreshed versions of the ID 140, ID components, and/or any content 130. When the first user interface was unloaded, template files used for rendering ID 140 and authorizations may have been cached. The selection component 124 may locate the cached files and download the current portions of the files that may not have been saved because they were associated with perishable content. The selection component 124 may initiate a communication session with the provider server 150, content provider server 180, presence server 170, or other component to access the desired files. When combining the cached files with the newly generated current versions of the previously unloaded files, the selection component 124 may follow specialized routines to overcome issues presented by files having different versions. The selection component 124 may determine the routines to combine these files such that the desired current version of the first user interface may be restored to the mobile communication device 110.

The interface application 120 may also comprise a transaction component 126 that promotes the mobile communication device 110 interacting with the provider server 150 and/or the content provider server 180 and other components during sessions wherein ID 140 is in use on the mobile communication device 110. When the mobile communication device 110 is running the ID 140 and any associated content 130, the transaction component 126 may be used to transact business with the content provider server 180, for example accessing a mobile wallet 144 to complete a sale transaction. The transaction component 126 may be used to submit bids or other transaction communication when the content provider associated with the content provider server 180 is an auction company.

Figure 2:
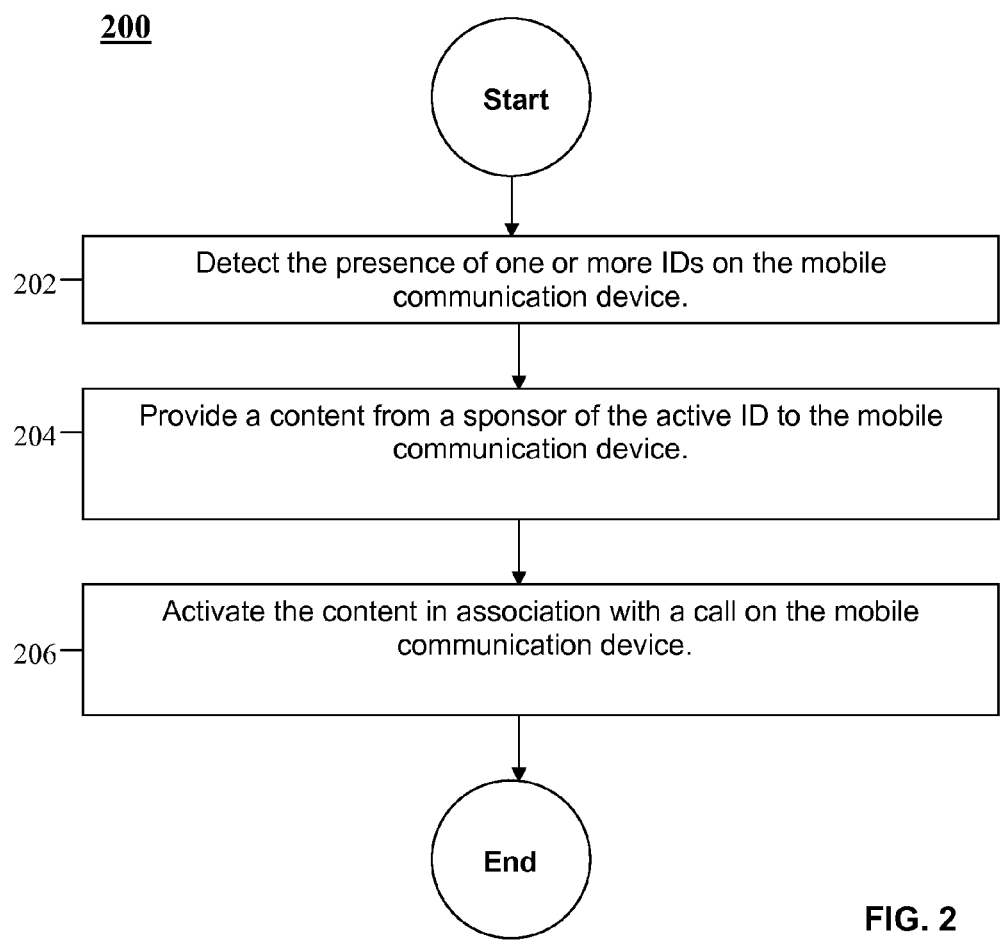
FIG. 2 is a flow chart illustrating a method according to an embodiment of the disclosure.

Turning now to FIG. 2, a method 200 is illustrated for providing content in association with a call on the mobile communication device 110. Beginning at block 202, the presence of one or more IDs 140, 142 on the mobile communication device 110 is detected. In an embodiment, the presence of the active ID and any additional IDs loaded on the mobile communication device 110 may be detected by the mobile communication device 110 and/or the provider server 150 and the information communicated to a presence server 170.

At block 204, content 186, 188 from the sponsor of the ID 140 active on the mobile communication device 110 may be provided to the mobile communication device 110. The content 186, 188 may be determined by a content provider server 180 based on information obtained from the presence server 170. For example, a content provider server 180 may query the presence server 170 to determine which ID 140 is active on the mobile communication device 110 and select content 186, 188 associated with the active ID 140 to provide to the mobile communication device 110. The content 186, 188 may be provided using network services so that the content 186, 188 is transferred to the mobile communication device 110 when needed during a transaction. In an embodiment, the content 186, 188 may be provided to the mobile communication device 110 based on a request from the active ID 140 during off-peak hours and stored in the memory of the mobile communication device 110 for future use. In an embodiment, the content provider server 180 may request preauthorization from the provider server 150 and/or the ID 140 active on the mobile communication device 110. If the preauthorization is provided by the provider server 150, the provider server 150 may pass an authorization token to the content provider server 180 to allow it to pass and load the content 186, 188 on the mobile communication device 110.

At block 206, the content 130 loaded on the mobile communication device 110 may be activated in association with a call on the mobile communication device 110. In an embodiment, a call on the mobile communication device 110 may comprise an incoming call, an outgoing call, a call reaching an internally hosted voicemail on the mobile communication device 110, and/or an externally hosted voicemail on a voicemail server 160. The content 130 may comprise any component of an ID 140 and/or any type of content described above.

Figure 3:
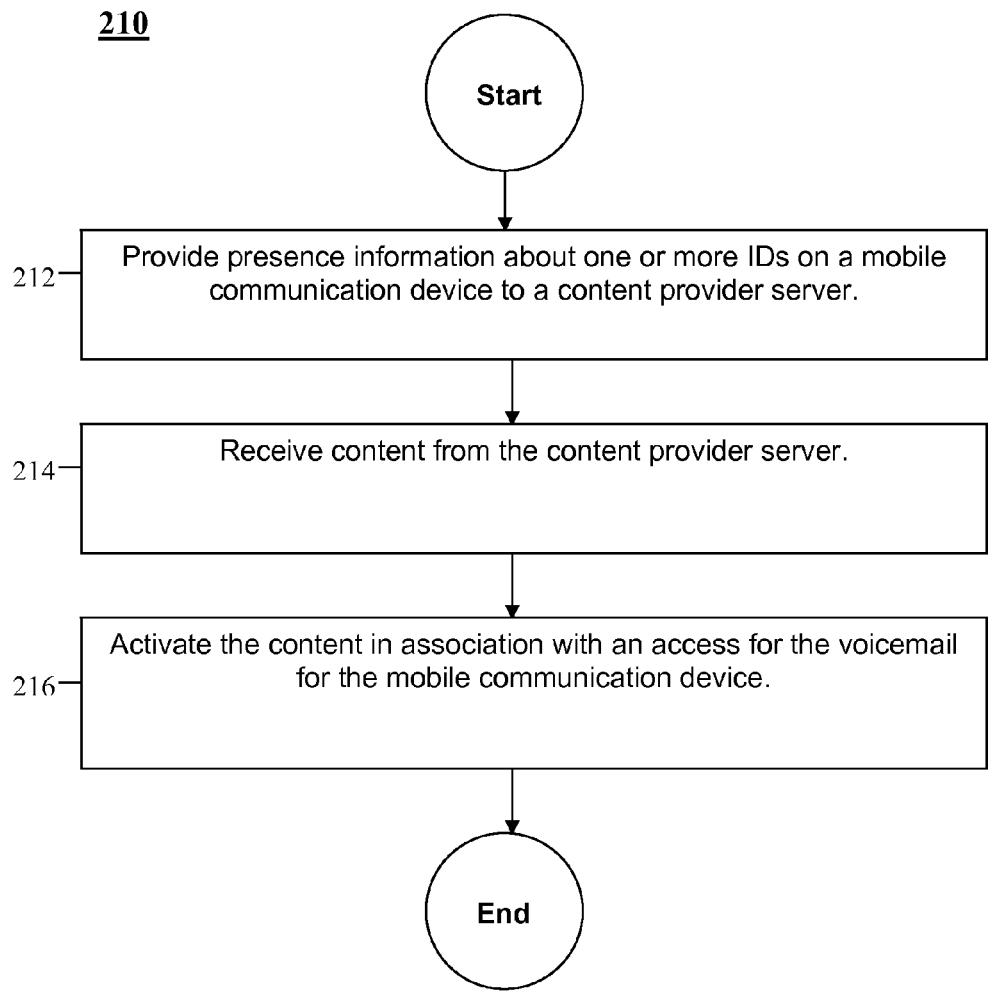
FIG. 3 is a flow chart illustrating a method according to an embodiment of the disclosure.

Turning to FIG. 3, a processor implemented method 210 is provided. At block 212, presence information about one or more IDs 140, 142 on the mobile communication device 110 is provided to a provider server 150. In an embodiment, the presence information may first be communicated to a presence server 170. A provider server 150 may then communicate the presence information from the presence server 170 to the content provider server 180, or the content provider server 180 may directly access the presence server 170 to obtain the presence information.

At block 214, content 186, 188 may be received from the content provider server 180 and stored as content 130 on the mobile communication device 110. The content 130 may be based on the presence information provided to the content provider server 180. At block 216, the content 130 may be activated in association with an access of a voicemail store on the mobile communication device 110. In an embodiment, the content 130 may be activated when the user of the mobile communication device 110 accesses the voicemail store on the mobile communication device 110. In another embodiment, the content 130 may be activated when a calling party reaches the voicemail store on the mobile communication device 110. For example, the content 130 may comprise a greeting associated with the content provider such as an advertisement. After listening to the advertisement, the caller may be directed to the voicemail store by the voicemail component 128 on the mobile communication device 110 to leave a message.

Figure 4:
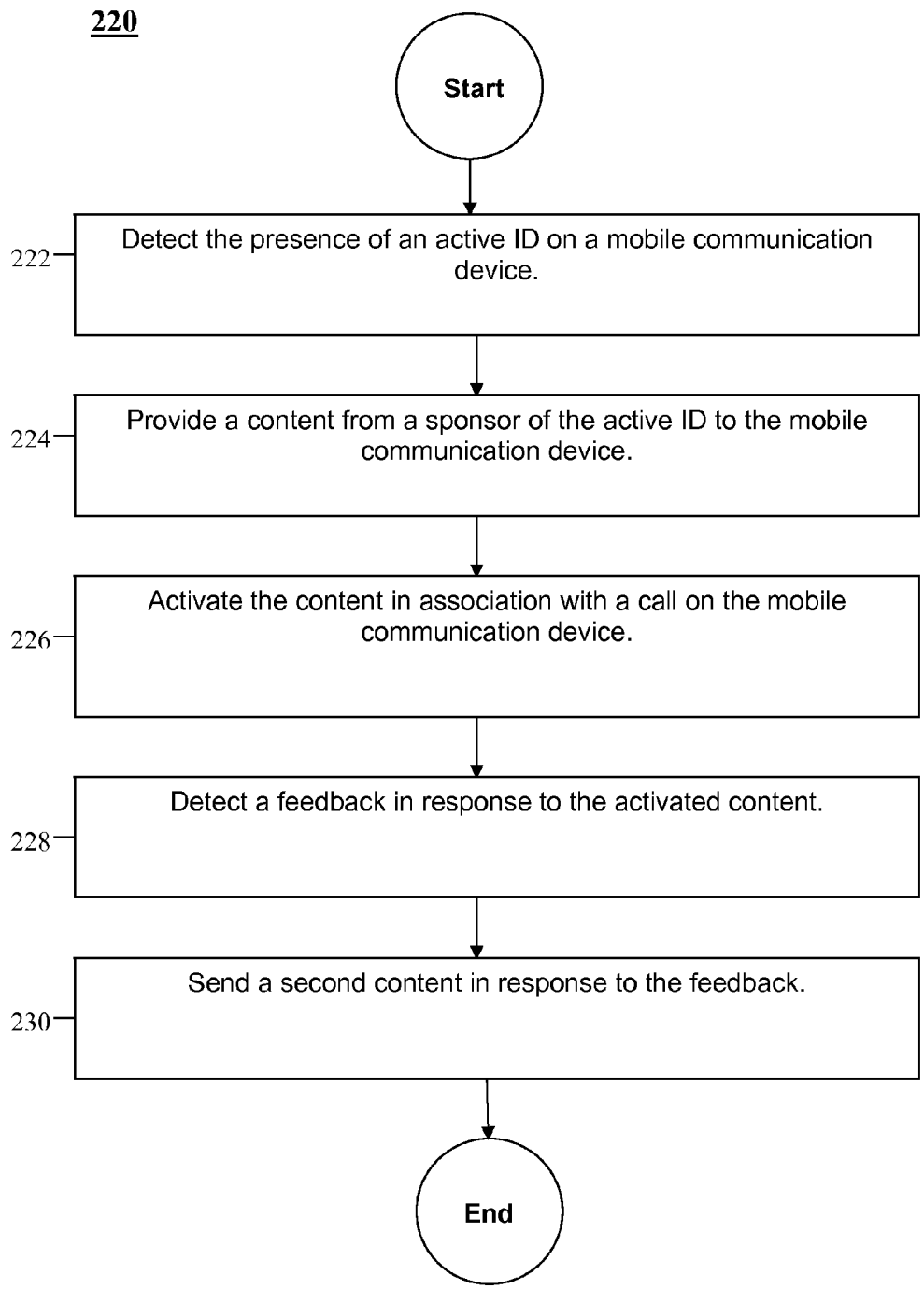
FIG. 4 is a flow chart illustrating a method according to an embodiment of the disclosure.

Turning to FIG. 4, a method 220 of providing content 130 to a mobile communication device 110 and receiving feedback is provided. At block 222, the presence of an active ID 140 on the mobile communication device 110 is detected. At block 224, content 156, 186, 188 is provided from a sponsor of the active ID 140 to the mobile communication device 110 and stored as content 130. At block 226, the content 130 is activated in association with a call on the mobile communication device 110. In an embodiment, the call may be an incoming or outgoing call, and/or an access of an internally stored voicemail or externally hosted voicemail. The content 130 provided and activated on the mobile communication device 110 may allow for user interaction and feedback. At block 228, the feedback may be detected in response to the activated content 130. At block 230, a second content may be sent in response to the feedback. For example, the content 130 may comprise an advertisement from the content provider associated with the active ID 140 on the mobile communication device 110. The advertisement may record an input in response to advertising a specific product. In response to the feedback in the form of the user input, the ID 140 may activate a second content such as a purchase transaction to allow the user to purchase the advertised product. In an embodiment, the transaction component 126 on the user's mobile communication device 110 may be used to allow the user to purchase an advertised product through a purchase transaction that interacts with a mobile wallet 144 on the mobile communication device 110.

Figure 5:
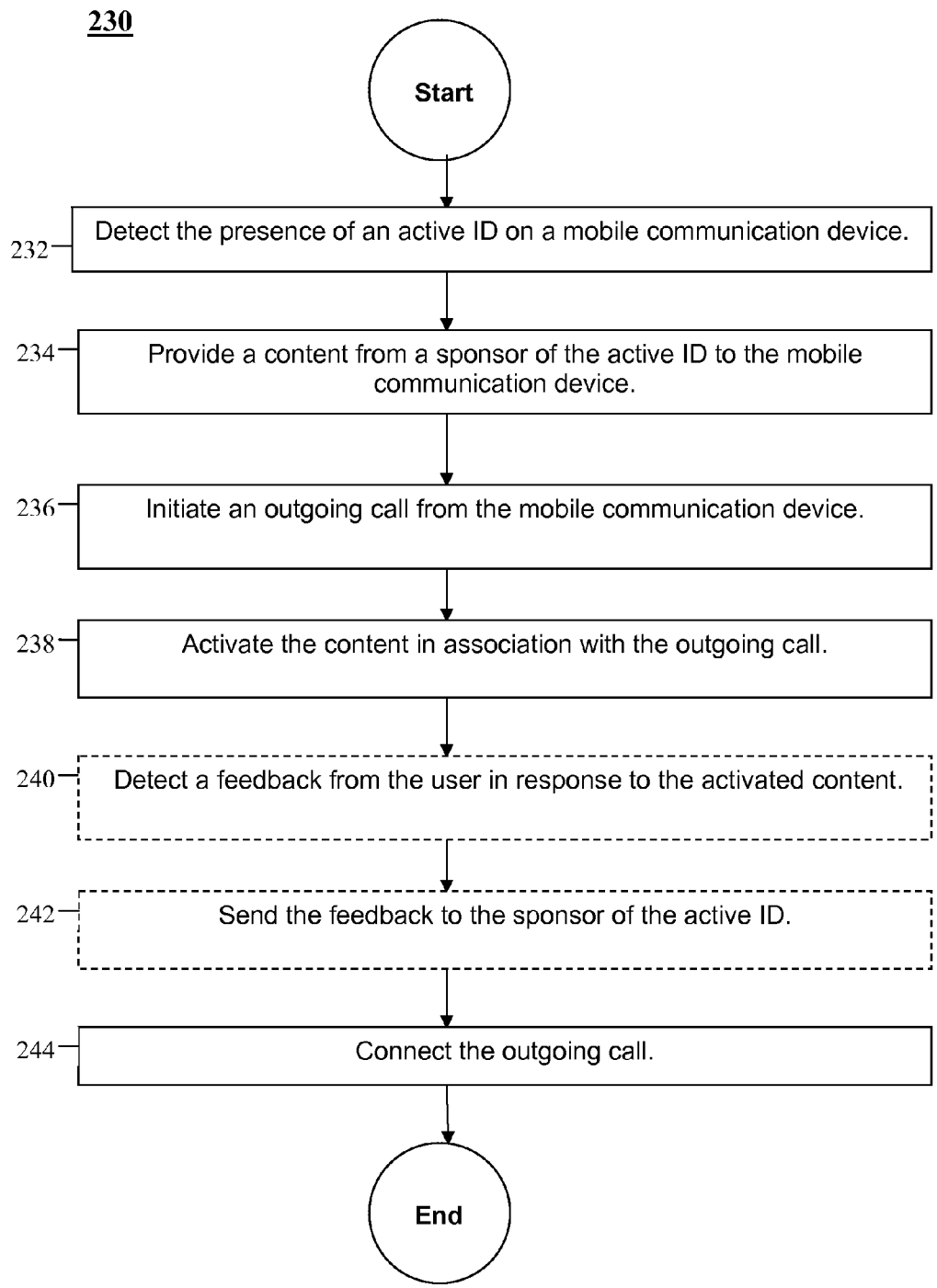
FIG. 5 is a flow chart illustrating a method according to an embodiment of the disclosure.

FIG. 5 illustrates an embodiment of a process 230 for providing content 130 in association with a call. In this embodiment, a first content provider may be a retailer of consumer products and may be associated with the content provider server 180. The first content provider may sponsor the creation of an ID 184 useful in advertising the first content provider's products. The ID 184 and the content 186 associated with the ID 184, when loaded and activated on a mobile communication device 110, may create a user interface that advertises or otherwise promotes the first content provider's products. For example, the content may comprise audio and/or graphical content that may display the first content provider's logo on the mobile communication device 110, present coupons for the first content provider's products, and/or play a sponsored ad upon using the functions of the mobile communication device 110. The user of the mobile communication device 110 may indicate a willingness to load the ID 184 onto the mobile communication device 110. Using the methods disclosed herein, the user may load the ID 140 and any associated content 130 on the mobile communication device 110. The user may then activate the ID 140 on the mobile communication device 110 to create the user interface sponsored by the first content provider.

Continuing with the embodiment of the process 230 shown in FIG. 5, the mobile communication device 110 may comprise a plurality of IDs 140, 142 installed on the device, only one of which is currently activated on the mobile communication device 110. The active ID 140 may comprise components that access network services from the first content provider and any additional content providers referenced by the first content provider located across networks. In order for the content provider to provide additional content 188 to the mobile communication device 110 and/or direct the components to the desired network services, the presence of the IDs 140, 142, content 130, and any other components on the mobile communication device 110 may be accessed by the first content provider. As shown at block 232, the presence of the active ID 140 on the mobile communication device 110 may be detected using any of the methods disclosed herein. In an embodiment, the presence of the active ID 140 and any content 130 on the mobile communication device 110 as detected in block 232 may be stored in a presence server 170. The first content provider may then access the presence server 170 (e.g., directly or through the provider server 150) to determine which ID 140 is active on the mobile communication device 110 and determine a content 186, 188 to provide to the mobile communication device 110 in association with the active ID 140.

As shown in block 234 of FIG. 5, content 186, 188 may be provided by the sponsor of the active ID 140 to the mobile communication device 110. In an embodiment, the content 186, 188 may be provided and loaded without user intervention. For example, the content 186, 188 loaded on the mobile communication device 110 may represent updated advertisements associated with the first content provider. As one example, the first content provider may advertise discounts on a new book each day or each week. The first content provider may access the presence server 170 and find that the active ID 140 is sponsored by the first content provider. The first content provider may then initiate a communication session with the mobile communication device 110 to provide an updated advertisement at periodic intervals to be loaded on the mobile communication device 110 as updated content 130. Alternatively, the content 130 could include new routing instructions to allow the components of the ID 140 to access network services across networks in order to obtain the updated advertisement when needed.

As shown in block 236 of FIG. 5, an outgoing call may be initiated from the mobile communication device 110. At block 238, the content 130 is activated in association with the outgoing call. The ID 140 running on the mobile communication device 110 using the interface application 120 may activate the display and/or initiation of the content 130, depending on the type or types of content associated with the active ID 140. For example, the content 130 may comprise an interactive advertisement sponsored by the first content provider having both audio and visual components. The advertisement may display an ad as a picture or video while simultaneously using a speaker associated with the mobile communication device 110 to play an audio track advertising a product.

As shown in block 240 of FIG. 5, a feedback may be optionally detected from the user of the mobile communication device 110 in response to the activated content 130. In an embodiment, the completion of the outgoing call may be delayed until the completion of the advertisement using the content 130. The ID 140 activated on the mobile communication device 110 may require a feedback from the user of the mobile communication device 110 before completing the outgoing call from the mobile communication device 110. In an embodiment, the feedback may come in a variety of forms using any of the inputs available on the mobile communication device 110. In an embodiment, the feedback may require a plurality of inputs. For example, the advertisement may present itself in the form of an interactive question and answer session. The advertisement may require that the user of the mobile communication device 110 correctly answer one or more questions before allowing the outgoing call to be completed. The feedback may be used to create data that can be associated with the mobile communication device 110 and the user of the mobile communication device 110. At block 242, the feedback may optionally be sent to the sponsor of the active ID 140. For example, the use of multiple choice in the question and answer format of an advertisement may allow the user's answer choice selections and order to be recorded to form a profile for the user stored as data on the mobile communication device 110. Through the use of multiple interactions between the user of the mobile communication device 110 and the content 130, the first content provider may develop a history of feedback from the user of the mobile communication device 110. Any changes in the feedback over time can be monitored and used by the first content provider. In another embodiment, the content 130 may comprise an advertisement for the first content provider's product. Upon receiving a feedback from the user of the mobile communication device 110, the transaction component 126 on the mobile communication device 110 may interact with a mobile wallet 144 to initiate a purchase transaction with the user of the mobile communication device 110.

After activating the content 130 and providing any optional feedback to the sponsor of the active ID 140, the outgoing call may be placed as shown in block 244. In exchange for the functionality provided by the ID 140 on the mobile communication device 110, the first content provider may subsidize, in part or in whole, the cost of the mobile device and/or the cost of the telecommunication services associated with the mobile communication device 110.

Figure 6:
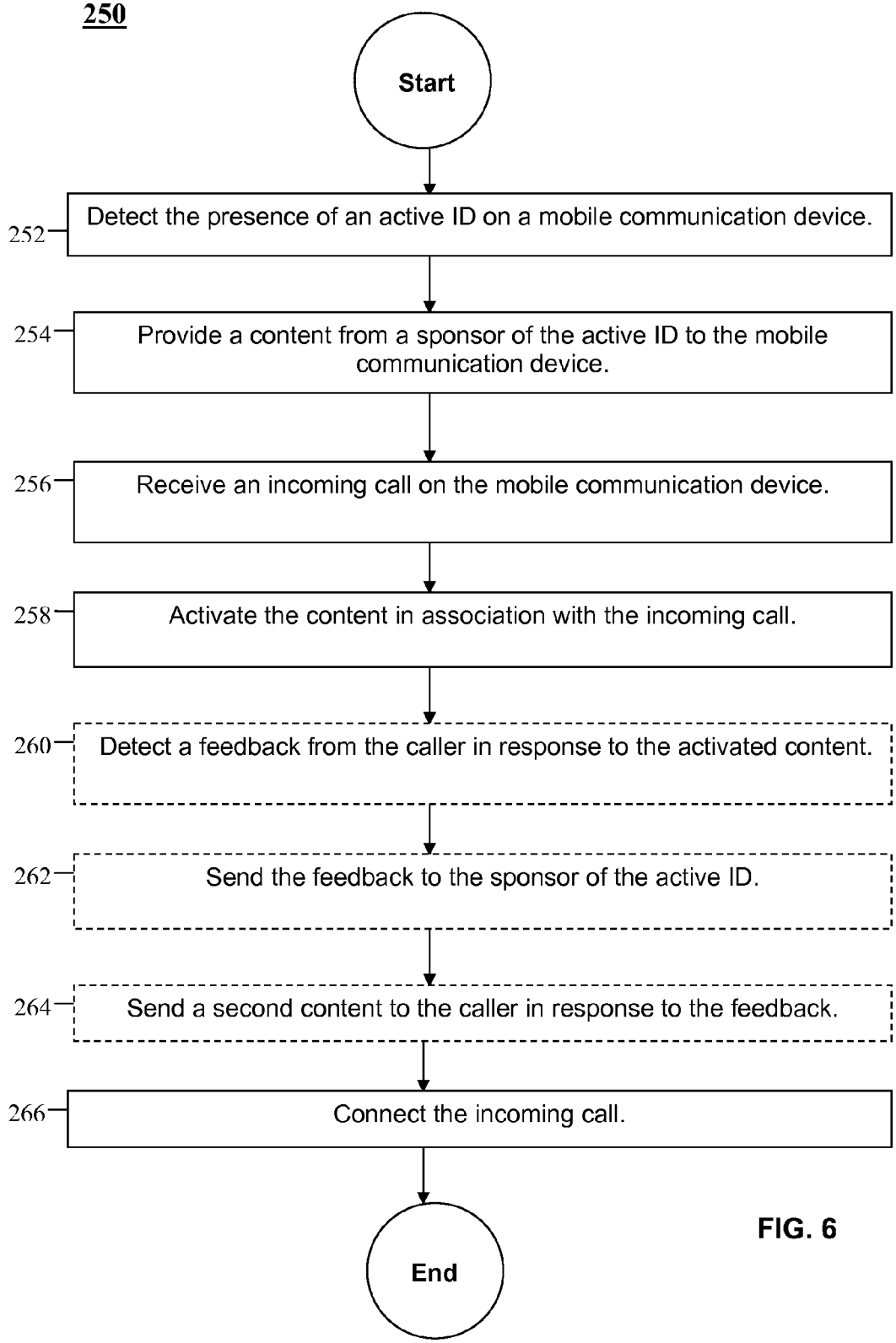
FIG. 6 is a flow chart illustrating a method according to an embodiment of the disclosure.

FIG. 6 illustrates an embodiment of a process 250 for providing content in association with a call. In this embodiment, a second content provider may be a retailer of consumer products and may be associated with the content provider server 180. The second content provider may be the same or different from the first content provider described above in reference to FIG. 5. The second content provider may sponsor the creation of an ID 184 useful in advertising the second content provider's products. The user may load and activate the ID 140 on the mobile communication device 110 to create the user interface sponsored by the second content provider.

Continuing with the embodiment of the process 250 shown in FIG. 6, the mobile communication device 110 may comprise a plurality of IDs 140, 142 installed on the device, only one of which is currently activated on the mobile communication device 110. As shown at block 252, the presence of the active ID 140 on the mobile communication device 110 may be detected using any of the methods disclosed herein. In an embodiment, the presence of the active ID 140 and any content 130 on the mobile communication device 110 as detected in block 252 may be stored in a presence server 170. The second content provider may then access the presence server 170 (e.g., directly or through the provider server 150) to determine which ID 140 is active on the mobile communication device 110 and determine a content 186, 188 to provide to the mobile communication device 110 in association with the active ID 140.

As shown in block 254 of FIG. 6, content 186, 188 may be provided by the sponsor of the active ID 140 to the mobile communication device 110. For example, the content 186, 188 may represent updated advertisements associated with the first content provider. As one example, the first content provider may advertise discounts on a new book each day or each week. The content 186, 188 may comprise a call tone with an advertising theme, such as an audio recording describing the book of the week. As shown in block 256, an incoming call may be received on the mobile communication device 110. At block 258, the content 130 loaded on the mobile communication device 110 from the second content provider is activated in association with the incoming call. The ID 140 running on the mobile communication device 110 using the interface application 120 may activate the content 130. For example, the content 130 may optionally be played as the call tone to the caller.

The content 130 may include interactive content 130. For example, an advertisement may play and offer the caller an opportunity to provide feedback in the form of an input to indicate an interest in an advertised product. As shown in block 260, feedback from the caller may be detected in response to the activated content 186. Obtaining feedback from the caller may be carried out using a listener or other means to detect an input from the caller. For example, a caller may listen to an advertisement and be prompted to press a key if they are interested in learning more information and/or purchasing the product. If a feedback is received from the caller, as detected by the listener, the feedback may be sent to the sponsor of the active ID 140, as shown in block 262. The sponsor of the active ID 140 may then send a second content to the caller in response to the feedback, as shown in block 264. The second content may comprise any of the types of content as described herein. For example, a website may be sent to the caller to provide additional information about a product, and/or a communication session may be initiated with the caller to allow the purchase of a product, using for example SMS or premium SMS communications to the caller's own mobile communication device 110. The caller identification information contained in the incoming caller data may be used to identify the caller and the address for providing the second content to the caller. If no feedback is received, or after the caller provides the feedback, the incoming call may be connected to the mobile communication device 110 in block 266. In exchange for the functionality provided by the ID 140 on the mobile communication device 110, the second content provider may subsidize, in part or in whole, the cost of the mobile communication device 110 and/or the cost of the telecommunication services associated with the mobile communication device 110.

Figure 7:
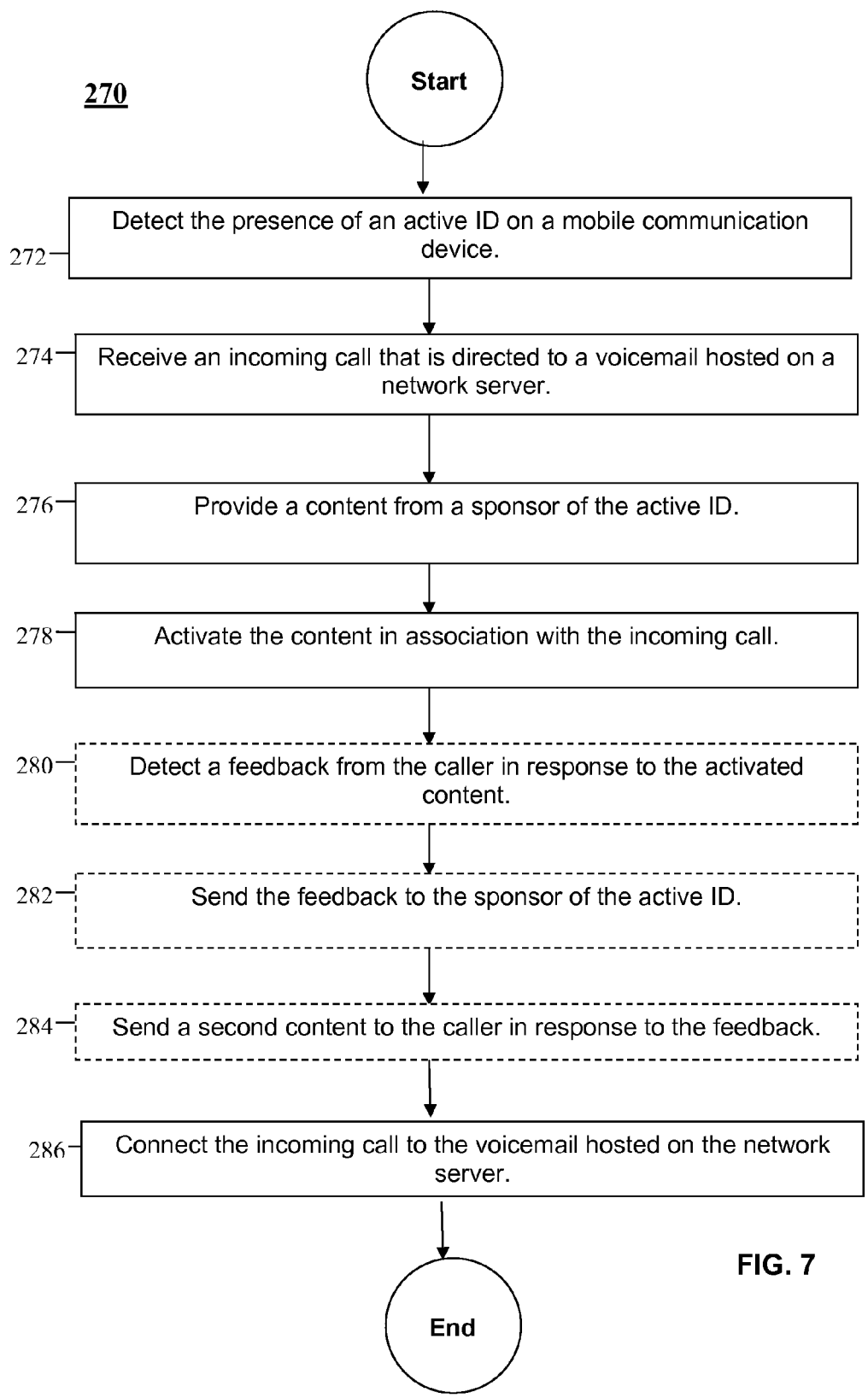
FIG. 7 is a flow chart illustrating a method according to an embodiment of the disclosure.

FIG. 7 illustrates an embodiment of a process 270 for providing content 156, 186, 188 in association with voicemail associated with a voicemail server 160. In this embodiment, a third content provider may be a retailer of consumer products and may be associated with the content provider server 180. The third content provider may be the same or different from the first or second content provider described above in reference to FIG. 5 and FIG. 6. The third content provider may sponsor the creation of an ID 184 useful in advertising the third content provider's products. The user may load and activate the ID 140 on the mobile communication device 110 to create the user interface sponsored by the third content provider.

Continuing with the embodiment of the process 270 shown in FIG. 7, the mobile communication device 110 may comprise a plurality of IDs 140, 142 loaded on the mobile communication device 110, only one of which is currently activated on the mobile communication device 110. As shown at block 272, the presence of the active ID 140 on the mobile communication device 110 may be detected using any of the methods disclosed herein. In an embodiment, the presence of the active ID 140 and any content 130 on the mobile communication device 110 as detected in block 272 may be stored in a presence server 170 associated with the network 192. The third content provider may then access the presence server 170 (e.g., directly or through the provider server 150) to determine which ID 140 is active on the mobile communication device 110 and determine a content to provide in association with the active ID 140.

As shown in block 274 of FIG. 7, a call may be received from a calling party that is directed to a voicemail hosted on a network server. For example, the voicemail associated with the mobile communication device 110 may be associated with the voicemail server 160 and the voicemail database 162. In block 276, content 186, 188 may be provided by the sponsor of the active ID 140. The content 186, 188 may be network based and may not be provided to the mobile communication device 110. Rather, the content 186, 188 may be provided to the provider server 150 and/or the voicemail server 160 for delivery to the calling party in association with the caller leaving a voicemail. The content 186, 188 may be stored on the provider server 150 and/or the voicemail server 160. Some portion of the content 186, 188 may be accessed over the network 192 when requested by the provider server 150 and/or the voicemail server 160. At block 278, the content 186, 188 may be activated in association with the incoming call reaching the network based voicemail. For example, the content 186, 188 may represent an advertisement associated with the third content provider. As one example, the content 186, 188 may comprise a call tone with an advertising theme, such as an audio recording describing the book of the week. When a caller is directed to the voicemail of the user of the mobile communication device 110, the call may be routed through the provider server 150 to the voicemail server 160, or directly to the voicemail server 160. The content 186, 188 may play in association with the call by accessing the content 156 stored on the provider server 150 and/or the voicemail server 160, or accessing the content 186, 188 over the network 192. For example, the content provider server 180 may provide the content 186, 188 during the access of the voicemail as requested by the provider server 150 and/or the voicemail server 160.

The content 186, 188 may include interactive content. For example, an advertisement may play and offer the caller an opportunity to provide feedback in the form of an input to indicate an interest in an advertised product. As shown in block 280, feedback from the caller may be detected in response to the activated content 186, 188. Obtaining feedback from the caller may be carried using a listener or other means to detect an input from the caller. If a feedback is received from the caller, as detected by the listener, the feedback may be sent to the sponsor of the active ID 140, as shown in block 282. The sponsor of the active ID 140 may then send a second content to the caller in response to the feedback, as shown in block 284. If no feedback is received, or after the caller provides the feedback, the incoming call may be connected to the voicemail hosted on the network server (e.g., the voicemail server 160) in block 286.

Figure 8:
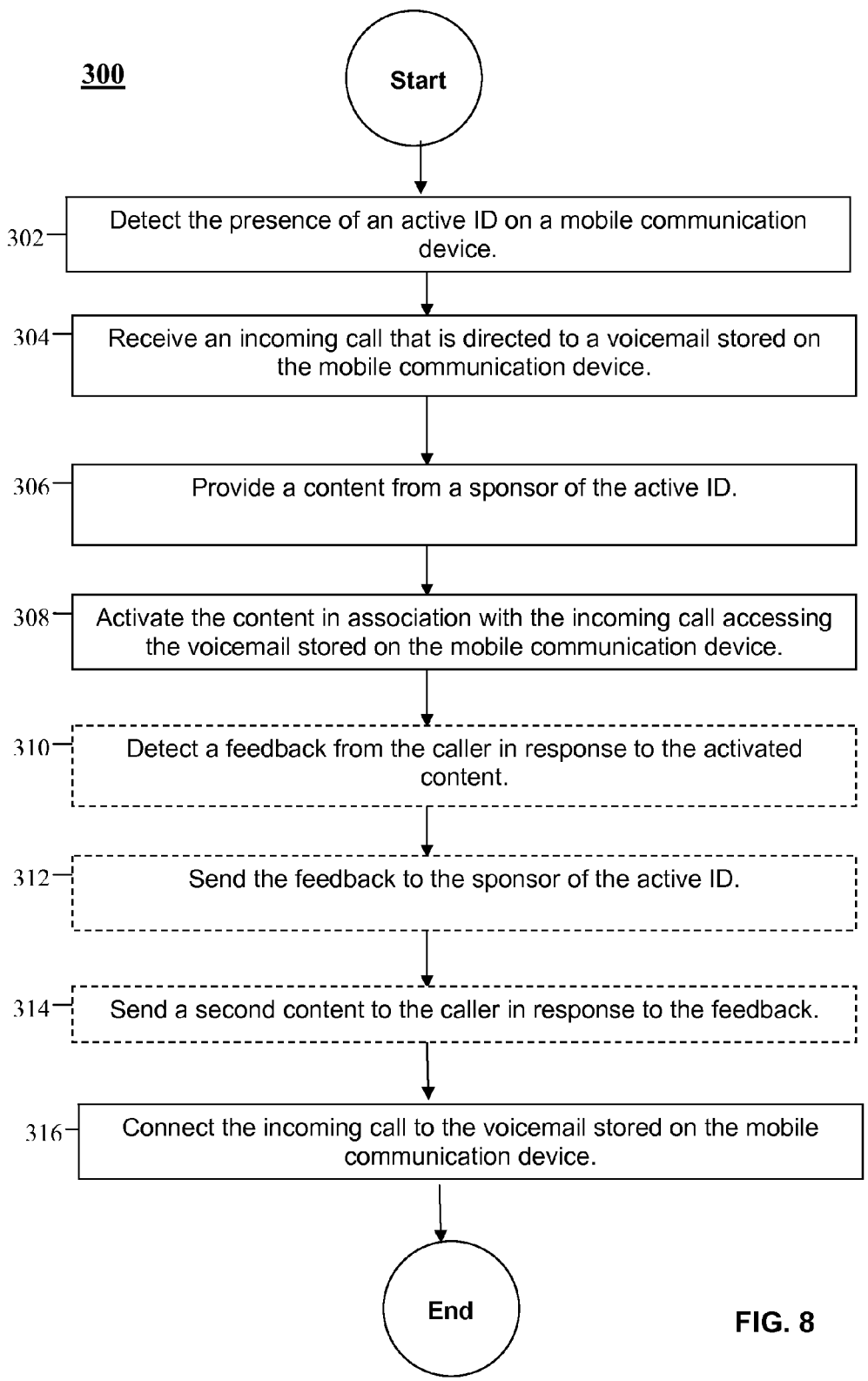
FIG. 8 is a flow chart illustrating a method according to an embodiment of the disclosure.

FIG. 8 illustrates an embodiment of a process 300 for providing content 156, 186, 188 in association with voicemail associated with the mobile communication device 110. In this embodiment, a fourth content provider may be a retailer of consumer products and may be associated with the content provider server 180. The fourth content provider may be the same or different from the first, second, and/or third content provider described above in reference to FIG. 5, 6, or 7. The fourth content provider may sponsor the creation of an ID 184 useful in advertising the fourth content provider's products. The user may load and activate the ID 140 on the mobile communication device 110 to create the user interface sponsored by the fourth content provider.

Continuing with the embodiment of the process 300 shown in FIG. 8, the mobile communication device 110 may comprise a plurality of IDs 140, 142 loaded on the mobile communication device 110, only one of which is currently activated. As shown at block 302, the presence of the active ID 140 on the mobile communication device 110 may be detected using any of the methods disclosed herein. In an embodiment, the presence of the active ID 140 and any content 130 on the mobile communication device 110 as detected in block 272 may be stored in a presence server 170 associated with the network 192. The fourth content provider may then access the presence server 170 (e.g., directly or through the provider server 150) to determine which ID 140 is active on the mobile communication device 110 and determine a content to provide to in association with the active ID 140.

As shown in block 304 of FIG. 8, a call may be received from a calling party that is directed to a voicemail stored on the mobile communication device 110. For example, the voicemail associated with the mobile communication device 110 may be handled via a voicemail component 128 on the mobile communication device 110, and individual voicemails may be stored on the internal memory of the mobile communication device 110. In block 306, content 156, 186, 188 may be provided by the sponsor of the active ID 140. Since the call may be directed to a voicemail component 128 loaded on the mobile communication device 110, the content 156, 186, 188 may be provided to the mobile communication device 110 and stored as content 130. In an embodiment, a portion of the content 156, 186, 188 may be provided over the network 192. At block 308, the content 130 may be activated in association with the incoming call reaching the voicemail component 128 on the mobile communication device 110. For example, the content 130 may represent an advertisement associated with the fourth content provider. As one example, the content may comprise a call tone with an advertising theme, such as an audio recording describing the book of the week. When a caller is directed to the voicemail component 128 on the mobile communication device 110, the content 130 may play in association with the call. The content 130 may be loaded on the mobile communication device 110 prior to the initiation of the incoming call and may be loaded during off-peak hours (e.g., between the hours of midnight and 4 a.m.).

The content 130 may include interactive content. For example, an advertisement may play and offer the caller an opportunity to provide feedback in the form of an input to indicate an interest in an advertised product. As shown in block 310, feedback from the caller may be detected in response to the activated content 130 using any of the means described herein. If a feedback is received from caller the feedback may be sent to the sponsor of the active ID 140, as shown in block 312. The sponsor of the active ID 140 may then send a second content to the caller in response to the feedback, as shown in block 314. If no feedback is received, or after the caller provides the feedback, the incoming call may be connected to the voicemail on the mobile communication device 110 in block 316.

Figure 9:
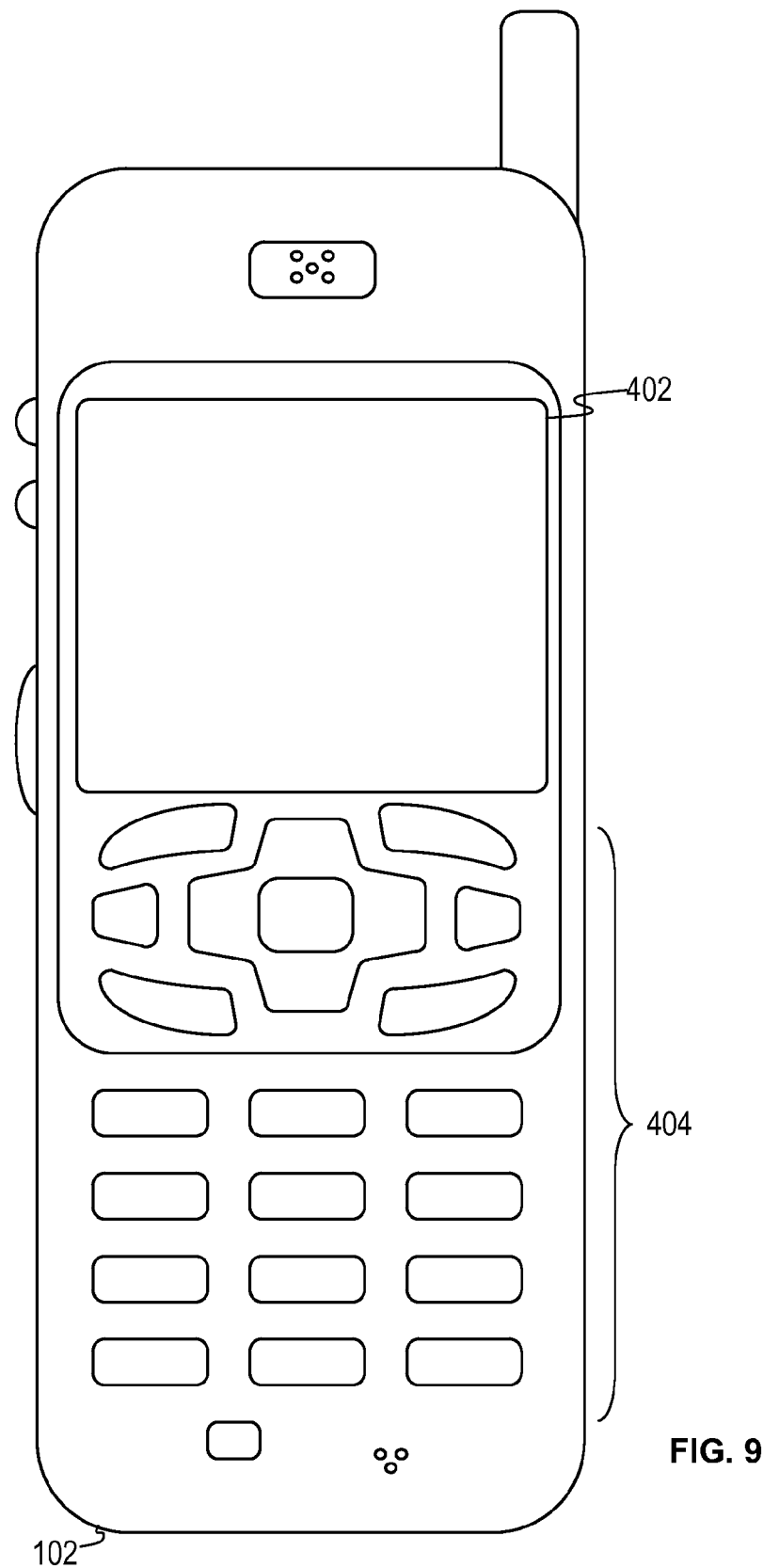
FIG. 9 is an illustration of a mobile device according to an embodiment of the disclosure.

FIG. 9 shows a mobile device 102. FIG. 9 depicts the mobile device 102, which is operable for implementing aspects of the present disclosure, but the present disclosure should not be limited to these implementations. The mobile device 102 may in some embodiments exemplify the mobile communication device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

Figure 10:
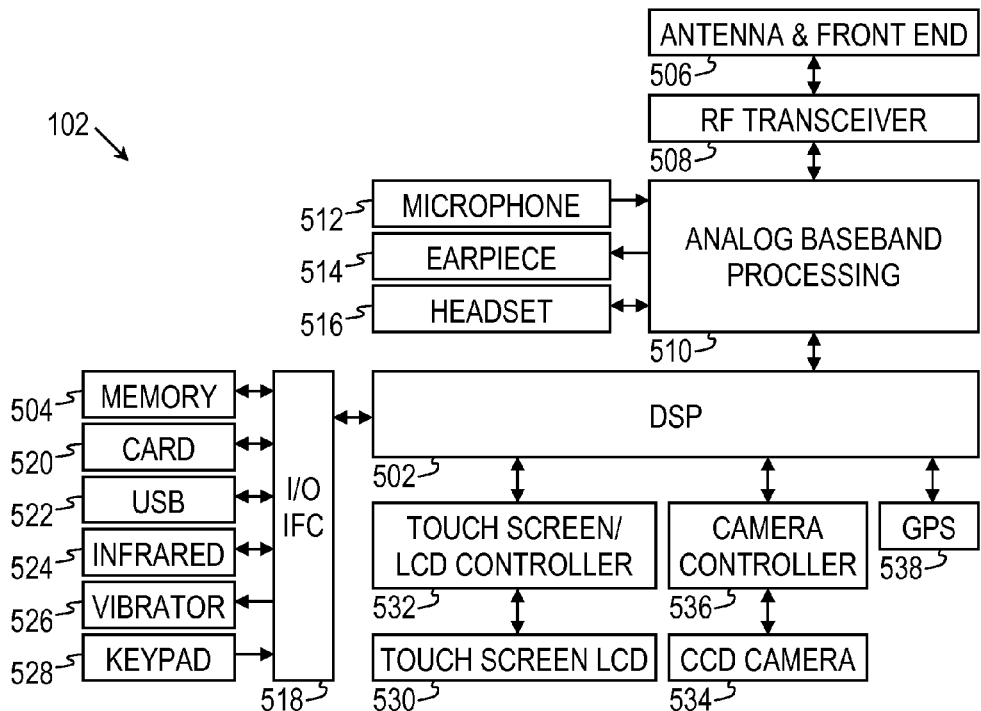
FIG. 10 is a block diagram of a mobile device according to an embodiment of the disclosure.

FIG. 10 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 11:
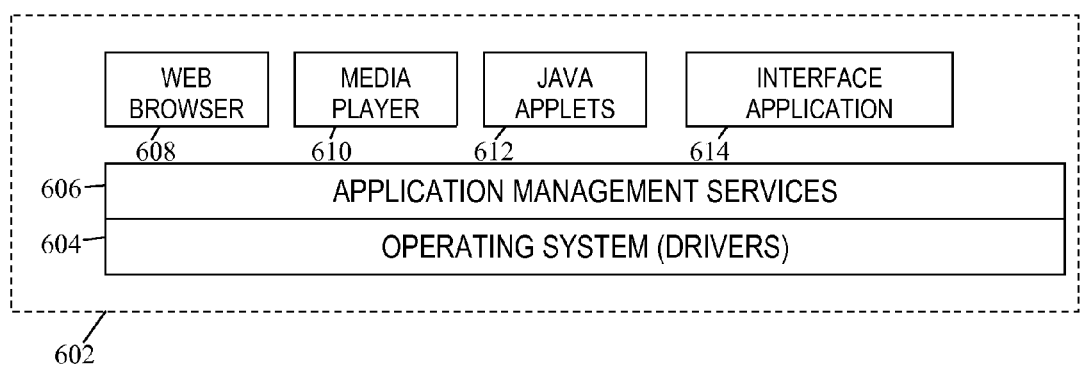
FIG. 11 is a block diagram of a software architecture for a mobile device according to an embodiment of the disclosure.

FIG. 11 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 11 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The interface application 614 may correspond to the interface application 120 provided by the system 100.

Figure 12:
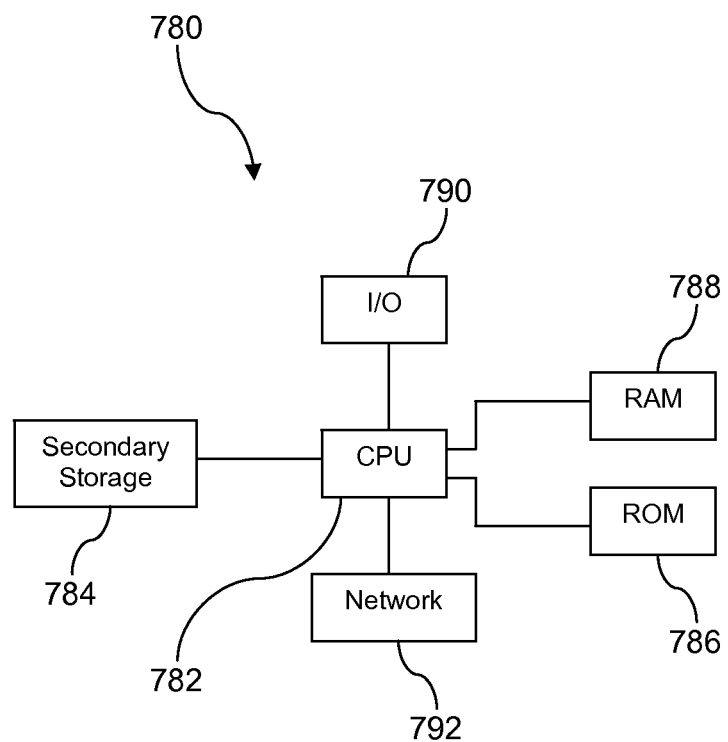
FIG. 12 illustrates an exemplary computer system suitable for implementing some aspects of the several embodiments of the disclosure.

FIG. 12 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for dynamically loading and mediating content associated with an ID by a content provider on a mobile communication device comprising:

detecting, by a mobile communication device or a provider server, presence information of a plurality of IDs stored on the mobile communication device via interaction with a presence component of an interface application on the mobile communication device, wherein the plurality of IDs is stored in a non-transitory memory on the mobile communication device, and wherein each of the plurality of IDs comprises an auto-installation routine and a plurality of an application, a media file, and a widget;

sending, by the mobile communication device or the provider server, the presence information to a presence server;

accessing, by a content provider server, the presence information from the presence server;

determining, by the content provider server, which ID of the plurality of IDs is active on the mobile communication device based on accessing the presence information from the presence server;

in response to the determining, providing, by the content provider server, a content related to the ID determined to be active from a sponsor of the active ID to the mobile communication device;

sending or receiving, by the mobile communication device, a voice call; and in response to the mobile communication device sending or receiving the voice call, activating, by the interface application on the mobile communication device, the content in association with the voice call on the mobile communication device.

2. The method of claim 1, wherein the presence information of the one or more IDs is stored on the presence server.

3. The method of claim 2, wherein detecting the presence of one or more IDs comprises sending a list of IDs stored on the mobile communication device and information about the ID from the mobile communication device to the presence server.

4. The method of claim 1, wherein the voice call comprises an incoming call or an outgoing call.

5. The method of claim 1, wherein providing the content comprises loading the content on the mobile communication device from a server associated with the sponsor.

6. The method of claim 5, wherein the content is loaded on the mobile communication device during off-peak hours.

7. The method of claim 1, wherein providing the content comprises accessing the content over a network.

8. The method of claim 1, wherein the content is selected from the group consisting of: web widgets, tiles, really simple syndication feed icons, media players, wallpapers, themes, ring tones, call tones, voicemail greetings, and listings of internet links.

9. The method of claim 1, wherein the content comprises one or more interactive features.

10. The method of claim 9, further comprising receiving data representing an input to the one or more interactive features.

11. The method of claim 10, further comprising sending an updated content to the mobile communication device in response to receiving the data representing the input to the one or more interactive features.

12. The method of claim 9, wherein the voice call is only connected after a caller provides the feedback in response to the one or more interactive features.

13. The method of claim 1, further comprising initiating a purchase transaction between a caller and the sponsor of the ID.

14. The method of claim 1, wherein the sponsor of the ID subsidizes the cost of the mobile communication device or the cost of a telecommunication service associated with the mobile communication device.

15. A method for dynamically loading and mediating content associated with an ID by a content provider on a mobile communication device comprising:

detecting, by a mobile communication device or a provider server, presence information of a plurality of IDs on the mobile communication device via interaction with a presence component of an interface application on the mobile communication device, wherein the plurality of IDs is stored in a non-transitory memory on the mobile communication device, and wherein each of the plurality of IDs comprises an auto-installation routine and a plurality of an application, a media file, and a widget;

sending, by the mobile communication device or the provider server, the presence information to a presence server;

accessing, by a content provider server, the presence information from the presence server;

determining, by the content provider server, which ID of the plurality of IDs is active on the mobile communication device based on accessing the presence information from the presence server;

in response to the determining, providing, by the content provider server, a content related to the ID determined to be active from a sponsor of the active ID to the mobile communication device;

sending or receiving, by the mobile communication device, a voice call;

in response to the mobile communication device sending or receiving the voice call, activating, by the interface application on the mobile communication device, the content in association with the voice call on the mobile communication device;

detecting a feedback from a caller in response to the activated content; and sending an updated content to the caller in response to the feedback.

16. The method of claim 15, wherein the voice call comprises an incoming call or an outgoing call, and wherein the caller comprises an incoming caller or an outgoing caller.

17. The method of claim 15, wherein the voice call is only connected after the caller provides the feedback in response to the activated content.

18. The method of claim 15, further comprising initiating a purchase transaction between the caller and the sponsor of the active ID.

19. The method of claim 18, further comprising interacting with a mobile wallet stored on the mobile communication device to complete the purchase transaction.

20. The method of claim 15, wherein the sponsor of the active ID subsidizes the cost of the mobile communication device or the cost of a telecommunication service associated with the mobile communication device.

* * * * *